(12) United States Patent
Tzschoppe et al.

(10) Patent No.: US 8,169,381 B2
(45) Date of Patent: May 1, 2012

(54) METHOD AND APPARATUS FOR SPATIAL DISPLAY USING A RASTERIZED IMAGING DEVICE AND AN ARRAY OF FILTER ELEMENTS

(75) Inventors: Wolfgang Tzschoppe, Jena-Rothenstein (DE); Thomas Brüggert, Jena (DE); Ingo Relke, Jena (DE); Stephan Otte, Jena (DE); Markus Klippstein, Jena (DE)

(73) Assignee: Phoenix 3D, Inc., Merrick, NY (US)

( * ) Notice: Subject to any disclaimer, the term of this patent is extended or adjusted under 35 U.S.C. 154(b) by 903 days.

(21) Appl. No.: 10/532,479

(22) PCT Filed: Feb. 25, 2004

(86) PCT No.: PCT/EP2004/001833
§ 371 (c)(1),
(2), (4) Date: Apr. 22, 2005

(87) PCT Pub. No.: WO2004/077839
PCT Pub. Date: Sep. 10, 2004

(65) Prior Publication Data
US 2005/0280602 A1    Dec. 22, 2005

(30) Foreign Application Priority Data
Feb. 26, 2003  (DE) .................................. 103 09 194

(51) Int. Cl.
*G09G 5/00* (2006.01)

(52) U.S. Cl. ................. 345/6; 348/51; 359/466

(58) Field of Classification Search .................. 345/4–6, 345/87, 32; 348/51, 54–60; 359/462, 466
See application file for complete search history.

(56) References Cited

U.S. PATENT DOCUMENTS

| | | | |
|---|---|---|---|
| 5,936,774 A | 8/1999 | Street | |
| 6,137,456 A | 10/2000 | Bhagavatula et al. | |
| 6,219,184 B1 | 4/2001 | Nagatani | |
| 6,266,187 B1 | 7/2001 | Dunn | |
| 6,337,721 B1 | 1/2002 | Hamagishi | |
| 6,452,595 B1 | 9/2002 | Montrym et al. | |

(Continued)

FOREIGN PATENT DOCUMENTS

CA    2492687 A1    1/2004

(Continued)

OTHER PUBLICATIONS

Dumbreck, A.A. and Smith, C.W., "3-D TV displays for industrial applications," IEE Colloquium on Stereoscopic Television, Oct. 15, 1992, pp. 7/1-7/4.

(Continued)

*Primary Examiner* — Lun-Yi Lao
*Assistant Examiner* — Shaheda A Abdin
(74) *Attorney, Agent, or Firm* — 24IP Law Group; Timothy R. DeWitt

(57) ABSTRACT

The invention relates to arrangements for spatial display, and in particular to such arrangements that, by means of wavelength or gray level filter arrays, present an image visible in three dimensions to one or several observers without the use of auxiliary aids such as glasses. In such arrangements, an increased brightness of the 3D display is achieved by means of the arrangement of transparent filters on the filter array according to the invention.

27 Claims, 46 Drawing Sheets

U.S. PATENT DOCUMENTS

| | | |
|---|---|---|
| 6,528,809 B1 | 3/2003 | Thomas et al. |
| 6,816,141 B1 | 11/2004 | Fergason |
| 7,046,271 B2 * | 5/2006 | Doerfel et al. .................. 348/51 |
| 7,075,643 B2 | 7/2006 | Holub |
| 7,321,343 B2 | 1/2008 | Klippstein et al. |
| 2002/0030888 A1 * | 3/2002 | Kleinberger et al. ......... 359/465 |
| 2003/0067539 A1 | 4/2003 | Doerfel et al. |
| 2004/0165263 A1 | 8/2004 | Sudo et al. |

FOREIGN PATENT DOCUMENTS

| | | |
|---|---|---|
| DE | 200 22 583 U1 | 1/2002 |
| DE | 10003326 C2 | 4/2002 |
| DE | 201 21 318 U1 | 8/2002 |
| DE | 20211612 U1 | 11/2002 |
| DE | 201 21 581 U1 | 5/2003 |
| EP | 0 752 610 A2 | 1/1997 |
| EP | 0783825 B1 | 10/2001 |
| EP | 1248473 A1 | 10/2002 |
| EP | 0791847 B1 | 1/2003 |
| EP | 1581012 A1 | 9/2005 |
| JP | 07287196 A | 10/1995 |
| JP | 08-194190 A | 7/1996 |
| JP | 08331605 A | 12/1996 |
| WO | 0156302 | 8/2001 |
| WO | WO 01/56265 A2 | 8/2001 |
| WO | 2004023348 A1 | 3/2004 |
| WO | 2004043079 A1 | 5/2004 |

OTHER PUBLICATIONS

Sexton, Ian, "Parallax barrier display systems," IEE Colloquium on Stereoscopic Television, Oct. 15, 1992, pp. 5/1-5/5.

* cited by examiner

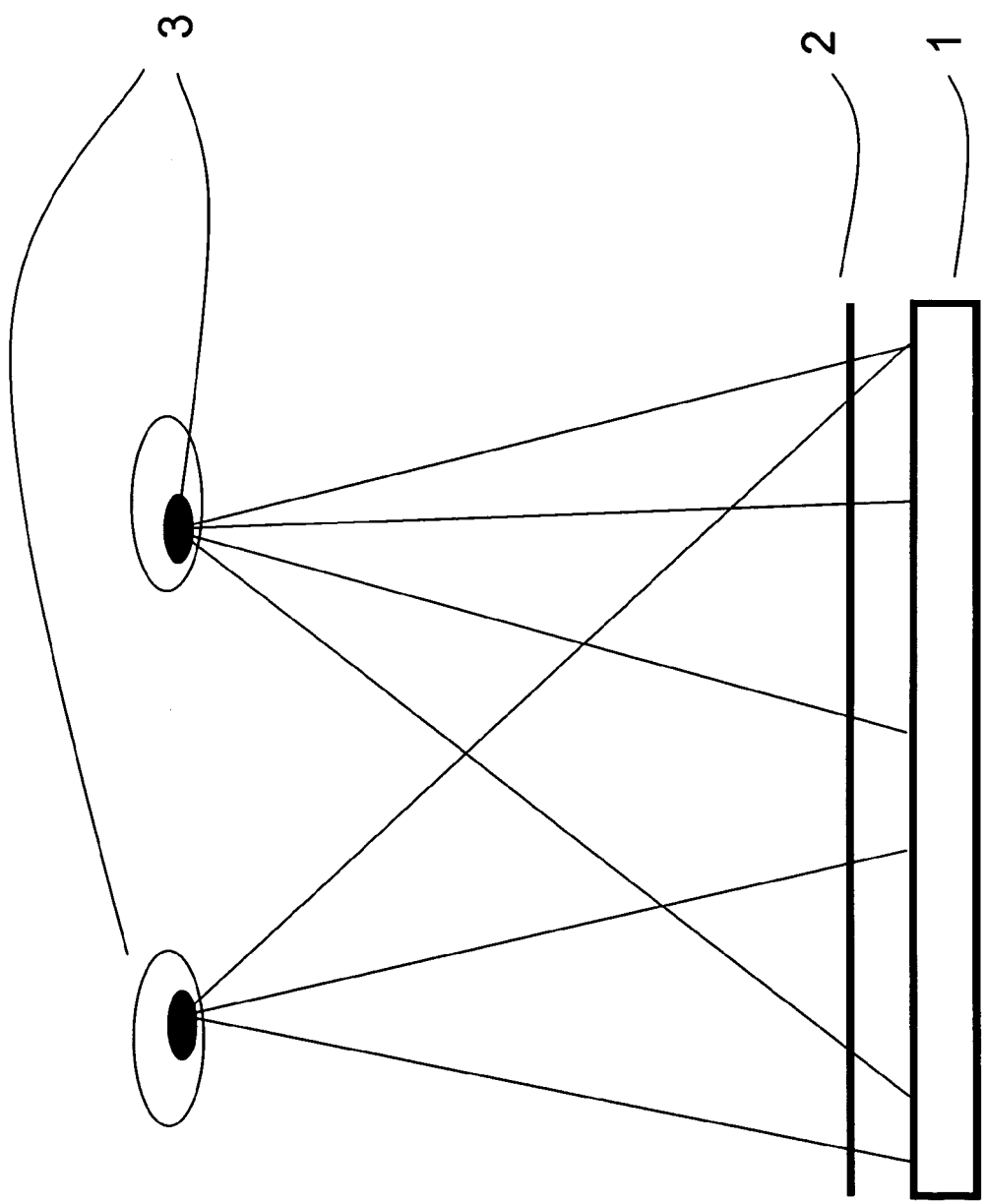

Fig.2

| i\j | 1 | 2 | 3 | 4 | 5 | 6 | 7 | 8 | 9 | 10 | 11 | 12 |
|---|---|---|---|---|---|---|---|---|---|---|---|---|
| 1 R | 2 | 2 | 2 | 3 | 3 | 3 | 4 | 4 | 4 | 1 | 1 | 1 |
| 2 G | 3 | 3 | 3 | 4 | 4 | 4 | 1 | 1 | 1 | 2 | 2 | 2 |
| 3 B | 4 | 4 | 4 | 1 | 1 | 1 | 2 | 2 | 2 | 3 | 3 | 3 |
| 4 R | 1 | 1 | 1 | 2 | 2 | 2 | 3 | 3 | 3 | 4 | 4 | 4 |
| 5 G | 2 | 2 | 2 | 3 | 3 | 3 | 4 | 4 | 4 | 1 | 1 | 1 |
| 6 B | 3 | 3 | 3 | 4 | 4 | 4 | 1 | 1 | 1 | 2 | 2 | 2 |
| 7 R | 4 | 4 | 4 | 1 | 1 | 1 | 2 | 2 | 2 | 3 | 3 | 3 |
| 8 G | 1 | 1 | 1 | 2 | 2 | 2 | 3 | 3 | 3 | 4 | 4 | 4 |
| 9 B | 2 | 2 | 2 | 3 | 3 | 3 | 4 | 4 | 4 | 1 | 1 | 1 |
| 10 R | 3 | 3 | 3 | 4 | 4 | 4 | 1 | 1 | 1 | 2 | 2 | 2 |
| 11 G | 4 | 4 | 4 | 1 | 1 | 1 | 2 | 2 | 2 | 3 | 3 | 3 |
| 12 B | 1 | 1 | 1 | 2 | 2 | 2 | 3 | 3 | 3 | 4 | 4 | 4 |
| 13 R | 2 | 2 | 2 | 3 | 3 | 3 | 4 | 4 | 4 | 1 | 1 | 1 |
| 14 G | 3 | 3 | 3 | 4 | 4 | 4 | 1 | 1 | 1 | 2 | 2 | 2 |
| 15 B | 4 | 4 | 4 | 1 | 1 | 1 | 2 | 2 | 2 | 3 | 3 | 3 |
| 16 R | 1 | 1 | 1 | 2 | 2 | 2 | 3 | 3 | 3 | 4 | 4 | 4 |

| i \ j | | 1 | 2 | 3 | 4 | 5 | 6 | 7 | 8 | 9 | 10 | 11 | 12 |
|---|---|---|---|---|---|---|---|---|---|---|---|---|---|
| 1 | R | 1 | 2 | 2 | 3 | 4 | 4 | 5 | 6 | 6 | 7 | 8 | 8 |
| 2 | G | 2 | 3 | 3 | 4 | 5 | 5 | 6 | 7 | 7 | 8 | 1 | 1 |
| 3 | B | 3 | 4 | 4 | 5 | 6 | 6 | 7 | 8 | 8 | 1 | 2 | 2 |
| 4 | R | 4 | 5 | 5 | 6 | 7 | 7 | 8 | 1 | 1 | 2 | 3 | 3 |
| 5 | G | 5 | 6 | 6 | 7 | 8 | 8 | 1 | 2 | 2 | 3 | 4 | 4 |
| 6 | B | 6 | 7 | 7 | 8 | 1 | 1 | 2 | 3 | 3 | 4 | 5 | 5 |
| 7 | R | 7 | 8 | 8 | 1 | 2 | 2 | 3 | 4 | 4 | 5 | 6 | 6 |
| 8 | G | 8 | 1 | 1 | 2 | 3 | 3 | 4 | 5 | 5 | 6 | 7 | 7 |
| 9 | B | 1 | 2 | 2 | 3 | 4 | 4 | 5 | 6 | 6 | 7 | 8 | 8 |
| 10 | R | 2 | 3 | 3 | 4 | 5 | 5 | 6 | 7 | 7 | 8 | 1 | 1 |
| 11 | G | 3 | 4 | 4 | 5 | 6 | 6 | 7 | 8 | 8 | 1 | 2 | 2 |
| 12 | B | 4 | 5 | 5 | 6 | 7 | 7 | 8 | 1 | 1 | 2 | 3 | 3 |
| 13 | R | 5 | 6 | 6 | 7 | 8 | 8 | 1 | 2 | 2 | 3 | 4 | 4 |
| 14 | G | 6 | 7 | 7 | 8 | 1 | 1 | 2 | 3 | 3 | 4 | 5 | 5 |
| 15 | B | 7 | 8 | 8 | 1 | 2 | 2 | 3 | 4 | 4 | 5 | 6 | 6 |
| 16 | R | 8 | 1 | 1 | 2 | 3 | 3 | 4 | 5 | 5 | 6 | 7 | 7 |
| 17 | G | 1 | 2 | 2 | 3 | 4 | 4 | 5 | 6 | 6 | 7 | 8 | 8 |
| 18 | B | 2 | 3 | 3 | 4 | 5 | 5 | 6 | 7 | 7 | 8 | 1 | 1 |
| 19 | R | 3 | 4 | 4 | 5 | 6 | 6 | 7 | 8 | 8 | 1 | 2 | 2 |
| 20 | G | 4 | 5 | 5 | 6 | 7 | 7 | 8 | 1 | 1 | 2 | 3 | 3 |
| 21 | B | 5 | 6 | 6 | 7 | 8 | 8 | 1 | 2 | 2 | 3 | 4 | 4 |

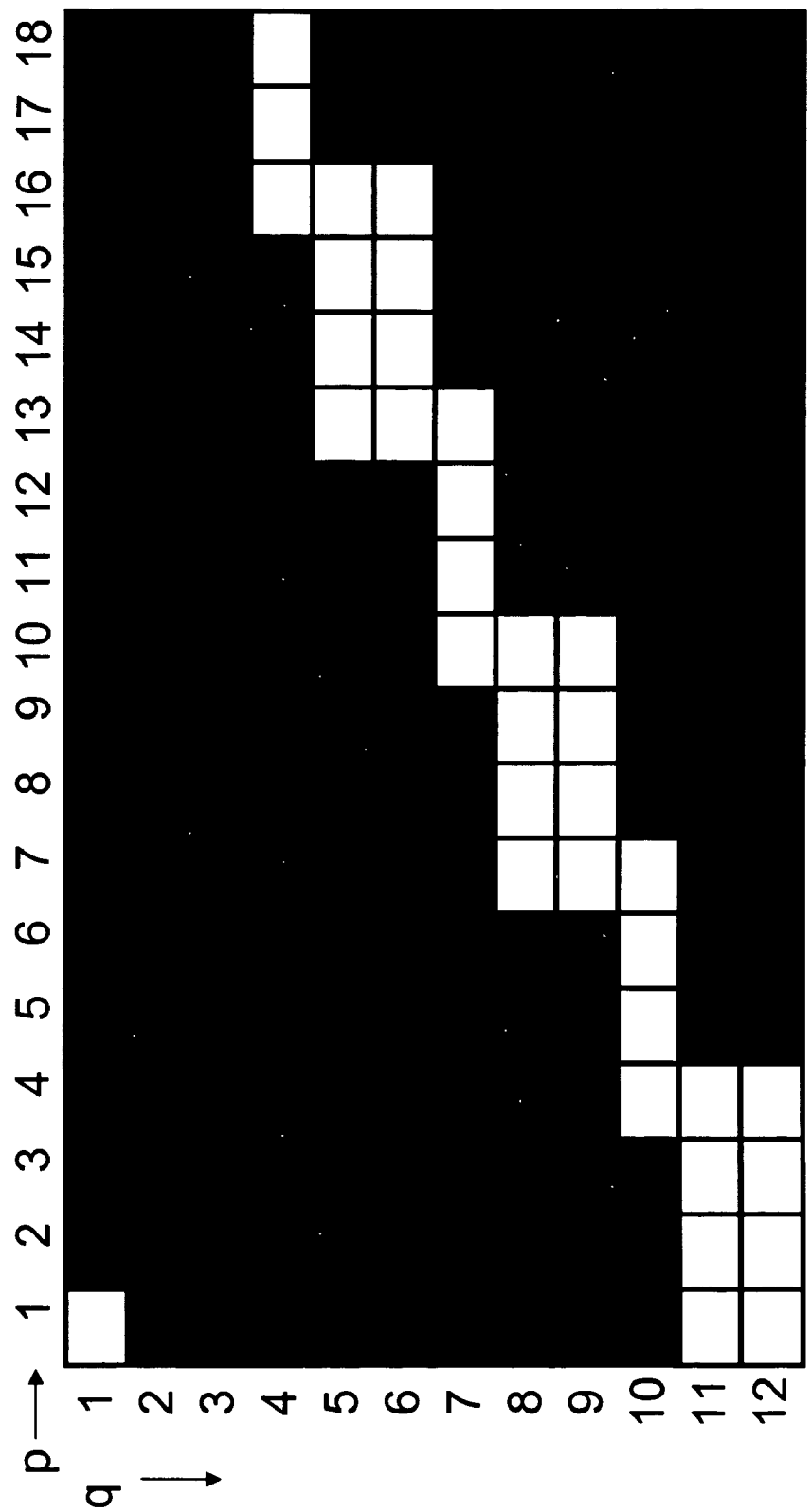

| i\j | R 1 | G 2 | B 3 | R 4 | G 5 | B 6 | R 7 | G 8 | B 9 | R 10 | G 11 | B 12 | R 13 | G 14 | B 15 | R 16 | G 17 | B 18 | R 19 | G 20 | B 21 |
|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 |
| 2 | 3 | 4 | 5 | 6 | 7 | 8 | 1 | 2 | 3 | 4 | 5 | 6 | 7 | 8 | 1 | 2 | 3 | 4 | 5 | 6 | 7 |
| 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| 4 | 4 | 5 | 6 | 7 | 8 | 1 | 2 | 3 | 4 | 5 | 6 | 7 | 8 | 1 | 2 | 3 | 4 | 5 | 6 | 7 | 8 |
| 5 | 5 | 6 | 7 | 8 | 1 | 2 | 3 | 4 | 5 | 6 | 7 | 8 | 1 | 2 | 3 | 4 | 5 | 6 | 7 | 8 | 1 |
| 6 | 6 | 7 | 8 | 1 | 2 | 3 | 4 | 5 | 6 | 7 | 8 | 1 | 2 | 3 | 4 | 5 | 6 | 7 | 8 | 1 | 2 |
| 7 | 7 | 8 | 1 | 2 | 3 | 4 | 5 | 6 | 7 | 8 | 1 | 2 | 3 | 4 | 5 | 6 | 7 | 8 | 1 | 2 | 3 |
| 8 | 7 | 8 | 1 | 2 | 3 | 4 | 5 | 6 | 7 | 8 | 1 | 2 | 3 | 4 | 5 | 6 | 7 | 8 | 1 | 2 | 3 |
| 9 | 8 | 1 | 2 | 3 | 4 | 5 | 6 | 7 | 8 | 1 | 2 | 3 | 4 | 5 | 6 | 7 | 8 | 1 | 2 | 3 | 4 |
| 10 | 1 | 2 | 3 | 4 | 5 | 6 | 7 | 8 | 1 | 2 | 3 | 4 | 5 | 6 | 7 | 8 | 1 | 2 | 3 | 4 | 5 |
| 11 | 2 | 3 | 4 | 5 | 6 | 7 | 8 | 1 | 2 | 3 | 4 | 5 | 6 | 7 | 8 | 1 | 2 | 3 | 4 | 5 | 6 |
| 12 | 2 | 3 | 4 | 5 | 6 | 7 | 8 | 1 | 2 | 3 | 4 | 5 | 6 | 7 | 8 | 1 | 2 | 3 | 4 | 5 | 6 |
| 13 | 3 | 4 | 5 | 6 | 7 | 8 | 1 | 2 | 3 | 4 | 5 | 6 | 7 | 8 | 1 | 2 | 3 | 4 | 5 | 6 | 7 |
| 14 | 4 | 5 | 6 | 7 | 8 | 1 | 2 | 3 | 4 | 5 | 6 | 7 | 8 | 1 | 2 | 3 | 4 | 5 | 6 | 7 | 8 |
| 15 | 5 | 6 | 7 | 8 | 1 | 2 | 3 | 4 | 5 | 6 | 7 | 8 | 1 | 2 | 3 | 4 | 5 | 6 | 7 | 8 | 1 |
| 16 | 5 | 6 | 7 | 8 | 1 | 2 | 3 | 4 | 5 | 6 | 7 | 8 | 1 | 2 | 3 | 4 | 5 | 6 | 7 | 8 | 1 |

| i | label | j=1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| 1 | R | 2 | 3 | 4 | 4 | 5 | 6 | 7 | 7 | 8 | 1 | 2 | 2 | 3 | 4 | 5 | 5 |
| 2 | G | 3 | 4 | 5 | 5 | 6 | 7 | 8 | 8 | 1 | 2 | 3 | 3 | 4 | 5 | 6 | 6 |
| 3 | B | 4 | 5 | 6 | 6 | 7 | 8 | 1 | 1 | 2 | 3 | 4 | 4 | 5 | 6 | 7 | 7 |
| 4 | R | 5 | 6 | 7 | 7 | 8 | 1 | 2 | 2 | 3 | 4 | 5 | 5 | 6 | 7 | 8 | 8 |
| 5 | G | 6 | 7 | 8 | 8 | 1 | 2 | 3 | 3 | 4 | 5 | 6 | 6 | 7 | 8 | 1 | 1 |
| 6 | B | 7 | 8 | 1 | 1 | 2 | 3 | 4 | 4 | 5 | 6 | 7 | 7 | 8 | 1 | 2 | 2 |
| 7 | R | 8 | 1 | 2 | 2 | 3 | 4 | 5 | 5 | 6 | 7 | 8 | 8 | 1 | 2 | 3 | 3 |
| 8 | G | 1 | 2 | 3 | 3 | 4 | 5 | 6 | 6 | 7 | 8 | 1 | 1 | 2 | 3 | 4 | 4 |
| 9 | B | 2 | 3 | 4 | 4 | 5 | 6 | 7 | 7 | 8 | 1 | 2 | 2 | 3 | 4 | 5 | 5 |
| 10 | R | 3 | 4 | 5 | 5 | 6 | 7 | 8 | 8 | 1 | 2 | 3 | 3 | 4 | 5 | 6 | 6 |
| 11 | G | 4 | 5 | 6 | 6 | 7 | 8 | 1 | 1 | 2 | 3 | 4 | 4 | 5 | 6 | 7 | 7 |
| 12 | B | 5 | 6 | 7 | 7 | 8 | 1 | 2 | 2 | 3 | 4 | 5 | 5 | 6 | 7 | 8 | 8 |
| 13 | R | 6 | 7 | 8 | 8 | 1 | 2 | 3 | 3 | 4 | 5 | 6 | 6 | 7 | 8 | 1 | 1 |
| 14 | G | 7 | 8 | 1 | 1 | 2 | 3 | 4 | 4 | 5 | 6 | 7 | 7 | 8 | 1 | 2 | 2 |
| 15 | B | 8 | 1 | 2 | 2 | 3 | 4 | 5 | 5 | 6 | 7 | 8 | 8 | 1 | 2 | 3 | 3 |
| 16 | R | 1 | 2 | 3 | 3 | 4 | 5 | 6 | 6 | 7 | 8 | 1 | 1 | 2 | 3 | 4 | 4 |
| 17 | G | 2 | 3 | 4 | 4 | 5 | 6 | 7 | 7 | 8 | 1 | 2 | 2 | 3 | 4 | 5 | 5 |
| 18 | B | 3 | 4 | 5 | 5 | 6 | 7 | 8 | 8 | 1 | 2 | 3 | 3 | 4 | 5 | 6 | 6 |
| 19 | R | 4 | 5 | 6 | 6 | 7 | 8 | 1 | 1 | 2 | 3 | 4 | 4 | 5 | 6 | 7 | 7 |
| 20 | G | 5 | 6 | 7 | 7 | 8 | 1 | 2 | 2 | 3 | 4 | 5 | 5 | 6 | 7 | 8 | 8 |
| 21 | B | 6 | 7 | 8 | 8 | 1 | 2 | 3 | 3 | 4 | 5 | 6 | 6 | 7 | 8 | 1 | 1 |

Fig.27

| i\j | 1 R | 2 G | 3 B | 4 R | 5 G | 6 B | 7 R | 8 G | 9 B | 10 R | 11 G | 12 B | 13 R | 14 G | 15 B | 16 R | 17 G | 18 B | 19 R | 20 G | 21 B |
|---|---|---|---|---|---|---|---|---|---|---|---|---|---|---|---|---|---|---|---|---|---|
| 1 | 1 | 2 | 3 | 4 | 5 | 6 | 7 | 8 | 1 | 2 | 3 | 4 | 5 | 6 | 7 | 8 | 1 | 2 | 3 | 4 | 5 |
| 2 | 2 | 3 | 4 | 5 | 6 | 7 | 8 | 1 | 2 | 3 | 4 | 5 | 6 | 7 | 8 | 1 | 2 | 3 | 4 | 5 | 6 |
| 3 | 4 | 4 | 4 | 4 | 4 | 4 | 4 | 4 | 4 | 4 | 4 | 4 | 4 | 4 | 4 | 4 | 4 | 4 | 4 | 4 | 4 |
| 4 | 3 | 4 | 5 | 6 | 7 | 8 | 1 | 2 | 3 | 4 | 5 | 6 | 7 | 8 | 1 | 2 | 3 | 4 | 5 | 6 | 7 |
| 5 | 4 | 5 | 6 | 7 | 8 | 1 | 2 | 3 | 4 | 5 | 6 | 7 | 8 | 1 | 2 | 3 | 4 | 5 | 6 | 7 | 8 |
| 6 | 4 | 4 | 4 | 4 | 4 | 4 | 4 | 4 | 4 | 4 | 4 | 4 | 4 | 4 | 4 | 4 | 4 | 4 | 4 | 4 | 4 |
| 7 | 5 | 6 | 7 | 8 | 1 | 2 | 3 | 4 | 5 | 6 | 7 | 8 | 1 | 2 | 3 | 4 | 5 | 6 | 7 | 8 | 1 |
| 8 | 6 | 7 | 8 | 1 | 2 | 3 | 4 | 5 | 6 | 7 | 8 | 1 | 2 | 3 | 4 | 5 | 6 | 7 | 8 | 1 | 2 |
| 9 | 4 | 4 | 4 | 4 | 4 | 4 | 4 | 4 | 4 | 4 | 4 | 4 | 4 | 4 | 4 | 4 | 4 | 4 | 4 | 4 | 4 |
| 10 | 7 | 8 | 1 | 2 | 3 | 4 | 5 | 6 | 7 | 8 | 1 | 2 | 3 | 4 | 5 | 6 | 7 | 8 | 1 | 2 | 3 |
| 11 | 8 | 1 | 2 | 3 | 4 | 5 | 6 | 7 | 8 | 1 | 2 | 3 | 4 | 5 | 6 | 7 | 8 | 1 | 2 | 3 | 4 |
| 12 | 4 | 4 | 4 | 4 | 4 | 4 | 4 | 4 | 4 | 4 | 4 | 4 | 4 | 4 | 4 | 4 | 4 | 4 | 4 | 4 | 4 |

| i↓ \ j→ |  | 1 | 2 | 3 | 4 | 5 | 6 | 7 | 8 | 9 | 10 | 11 | 12 |
|---|---|---|---|---|---|---|---|---|---|---|---|---|---|
| 1 | R | 5 | 5 | 5 | 5 | 5 | 5 | 5 | 5 | 5 | 5 | 5 | 5 |
| 2 | G | 2 | 3 | 3 | 4 | 5 | 5 | 6 | 7 | 7 | 8 | 1 | 1 |
| 3 | B | 3 | 4 | 4 | 5 | 6 | 6 | 7 | 8 | 8 | 1 | 2 | 2 |
| 4 | R | 4 | 5 | 5 | 6 | 7 | 7 | 8 | 1 | 1 | 2 | 3 | 3 |
| 5 | G | 5 | 5 | 5 | 5 | 5 | 5 | 5 | 5 | 5 | 5 | 5 | 5 |
| 6 | B | 6 | 7 | 7 | 8 | 1 | 1 | 2 | 3 | 3 | 4 | 5 | 5 |
| 7 | R | 7 | 8 | 8 | 1 | 2 | 2 | 3 | 4 | 4 | 5 | 6 | 6 |
| 8 | G | 8 | 1 | 1 | 2 | 3 | 3 | 4 | 5 | 5 | 6 | 7 | 7 |
| 9 | B | 5 | 5 | 5 | 5 | 5 | 5 | 5 | 5 | 5 | 5 | 5 | 5 |
| 10 | R | 2 | 3 | 3 | 4 | 5 | 5 | 6 | 7 | 7 | 8 | 1 | 1 |
| 11 | G | 3 | 4 | 4 | 5 | 6 | 6 | 7 | 8 | 8 | 1 | 2 | 2 |
| 12 | B | 4 | 5 | 5 | 6 | 7 | 7 | 8 | 1 | 1 | 2 | 3 | 3 |
| 13 | R | 5 | 5 | 5 | 5 | 5 | 5 | 5 | 5 | 5 | 5 | 5 | 5 |
| 14 | G | 6 | 7 | 7 | 8 | 1 | 1 | 2 | 3 | 3 | 4 | 5 | 5 |
| 15 | B | 7 | 8 | 8 | 1 | 2 | 2 | 3 | 4 | 4 | 5 | 6 | 6 |
| 16 | R | 8 | 1 | 1 | 2 | 3 | 3 | 4 | 5 | 5 | 6 | 7 | 7 |
| 17 | G | 5 | 5 | 5 | 5 | 5 | 5 | 5 | 5 | 5 | 5 | 5 | 5 |
| 18 | B | 2 | 3 | 3 | 4 | 5 | 5 | 6 | 7 | 7 | 8 | 1 | 1 |
| 19 | R | 3 | 4 | 4 | 5 | 6 | 6 | 7 | 8 | 8 | 1 | 2 | 2 |
| 20 | G | 4 | 5 | 5 | 6 | 7 | 7 | 8 | 1 | 1 | 2 | 3 | 3 |
| 21 | B | 5 | 5 | 5 | 5 | 5 | 5 | 5 | 5 | 5 | 5 | 5 | 5 |

| i \ j | | 1 | 2 | 3 | 4 | 5 | 6 | 7 | 8 | 9 | 10 | 11 | 12 |
|---|---|---|---|---|---|---|---|---|---|---|---|---|---|
| 1 | R | 1 | 2 | 3 | 4 | 5 | 6 | 1 | 2 | 3 | 4 | 5 | 6 |
| 2 | G | 1 | 2 | 3 | 4 | 5 | 6 | 1 | 2 | 3 | 4 | 5 | 6 |
| 3 | B | 2 | 3 | 4 | 5 | 6 | 1 | 2 | 3 | 4 | 5 | 6 | 1 |
| 4 | R | 3 | 4 | 5 | 6 | 1 | 2 | 3 | 4 | 5 | 6 | 1 | 2 |
| 5 | G | 4 | 5 | 6 | 1 | 2 | 3 | 4 | 5 | 6 | 1 | 2 | 3 |
| 6 | B | 4 | 5 | 6 | 1 | 2 | 3 | 4 | 5 | 6 | 1 | 2 | 3 |
| 7 | R | 5 | 6 | 1 | 2 | 3 | 4 | 5 | 6 | 1 | 2 | 3 | 4 |
| 8 | G | 6 | 1 | 2 | 3 | 4 | 5 | 6 | 1 | 2 | 3 | 4 | 5 |
| 9 | B | 1 | 2 | 3 | 4 | 5 | 6 | 1 | 2 | 3 | 4 | 5 | 6 |
| 10 | R | 1 | 2 | 3 | 4 | 5 | 6 | 1 | 2 | 3 | 4 | 5 | 6 |
| 11 | G | 2 | 3 | 4 | 5 | 6 | 1 | 2 | 3 | 4 | 5 | 6 | 1 |
| 12 | B | 3 | 4 | 5 | 6 | 1 | 2 | 3 | 4 | 5 | 6 | 1 | 2 |
| 13 | R | 4 | 5 | 6 | 1 | 2 | 3 | 4 | 5 | 6 | 1 | 2 | 3 |
| 14 | G | 4 | 5 | 6 | 1 | 2 | 3 | 4 | 5 | 6 | 1 | 2 | 3 |
| 15 | B | 5 | 6 | 1 | 2 | 3 | 4 | 5 | 6 | 1 | 2 | 3 | 4 |
| 16 | R | 6 | 1 | 2 | 3 | 4 | 5 | 6 | 1 | 2 | 3 | 4 | 5 |
| 17 | G | 1 | 2 | 3 | 4 | 5 | 6 | 1 | 2 | 3 | 4 | 5 | 6 |
| 18 | B | 1 | 2 | 3 | 4 | 5 | 6 | 1 | 2 | 3 | 4 | 5 | 6 |
| 19 | R | 2 | 3 | 4 | 5 | 6 | 1 | 2 | 3 | 4 | 5 | 6 | 1 |
| 20 | G | 3 | 4 | 5 | 6 | 1 | 2 | 3 | 4 | 5 | 6 | 1 | 2 |
| 21 | B | 4 | 5 | 6 | 1 | 2 | 3 | 4 | 5 | 6 | 1 | 2 | 3 |

METHOD AND APPARATUS FOR SPATIAL DISPLAY USING A RASTERIZED IMAGING DEVICE AND AN ARRAY OF FILTER ELEMENTS

FIELD OF THE INVENTION

The invention relates to arrangements for spatial display, and in particular to such arrangements that present an image visible in three dimensions to one or several observers without the use of auxiliary aids such as glasses.

BACKGROUND OF THE INVENTION

Various methods and arrangements of the kind are known in prior art.

Many of the known methods and arrangements for spatial display are based on the spatial or spatial-temporal splitting of different views of a scene on an image display device. The said views are, as a rule, either images taken of different stratigraphic depth planes or from different perspectives. The image display devices are, e.g., LC displays, which are in increasingly widespread use. U.S. Pat. No. 5,936,774, for instance, describes a method and an arrangement for the autostereoscopic presentation of two to four perspective views on an LC display. Arrangements autostereoscopic presentation based on LC displays are also described in EP 0 791 847, EP 0 783 825, and JP 8 194 190. An advantageous arrangement of this kind is described in DE 100 03 326 C2; it uses at least one wavelength filter array, which assigns propagation directions to light coming from different pixels. The said picture elements visualize bits of partial image information from different views of a scene or object. Due to the light propagation directions assigned, the left and right eyes of an observer predominantly see respectively a first and second selection of views, so that the observer gets a spatial impression.

Although these methods and arrangements have several advantages, such as the potential reduction of moire effects, suitability for a group of observers, and the possibility to do without auxiliary aids to spatial vision, they are characterized on the downside by an impaired brightness.

SUMMARY OF THE INVENTION

The problem of the invention is to improve arrangements of the kind described above in such a way as to achieve an increased brightness in 3D display. Another purpose is to achieve, in special embodiments of the arrangements according to the invention, an improved readability of normal text.

This problem is solved by an arrangement of the kind described before, for the spatial display of a scene or object, comprising an imaging device with a great number of picture elements (pixels) $\alpha_{ij}$ in a raster of rows j and columns i, in which the pixels $\alpha_{ij}$ render bits of partial information from at least three views $A_k$ (k=1 ... n, n≧3) of the scene or object, and further comprising one or several arrays of many wavelength and/or gray-level filters arranged in rows q and columns p and designed as filter elements $\beta_{pq}$, part of which are transparent to light of specified wavelength ranges, whereas the remaining part are opaque to light, these arrays being arranged (in viewing direction) in front of and/or behind the imaging device with the pixels $\alpha_{ij}$, so that propagation directions are given for the light emitted by the pixels $\alpha_{ij}$, and in which each pixel $\alpha_{ij}$ corresponds with several filter elements assigned to it, or each filter element corresponds with several pixels $\alpha_{ij}$ assigned to it, in such a way that each straight line connecting the area center of a visible segment of the pixel $\alpha_{ij}$ and the area center of a visible segment of the filter element corresponds to a propagation direction, and in which, within a viewing space in which the observer(s) is (are) located, the propagation directions intersect in a great number of intersection points, each of which represents an observer's position, so that an observer at any of these positions will predominantly see bits of partial information from a first selection of views with one eye, and predominantly bits of partial information from a second selection of views $A_k$ (k= 1 ... n); the said problem being solved in that, in at least a segment of at least one of the arrays, the ratio between the areas covered by filter elements $\beta_{pq}$ transparent to light of specified wavelength ranges and the total area of all filter elements $\beta_{pq}$, multiplied by the average number n' of the different views displayed per row j of the raster of pixels $\alpha_{ij}$, is greater than 1.

The brightness can be increased by allowing more light to reach the observer via the filter elements.

In a preferred version that is easy to manufacture, the filter elements transparent to light of specified wavelength ranges are designed as filters that are essentially transparent to light of the entire visible spectrum. Although the filter elements are mostly designed as directly selective wavelength filters, the arrangements according to the invention also work with any other kind of filters, such as, for example, polarizing filters or holographic optical elements.

Unlike in conventional arrangements, the 3D impression remains without noticeable impairments in such arrangements in which the transparent filters are so dimensioned that always more than one pixel $\alpha_{ij}$ is visible per visible raster segment relative to the pixel area. This is the case especially with such preferred embodiments of the invention in which the quotient of the sum of areas of the filter elements $\beta_{pq}$ that are largely transparent to light of essentially the entire visible spectrum and the sum of areas of all filter elements $\beta_{pq}$ of the respective array has a value that is between the quotient Q1=1.1/n' and the quotient Q2=1.8/n', so that, due to the filter elements $\beta_{pq}$ transmissive to light of the entire visible spectrum, always about 1.1 to 1.8 pixels $\alpha_{ij}$ are visible, on average, per visible segment of the raster relative to the pixel area. Experiments have shown, however, that this is also the case with quotients greater than 1.8, such as, for example, 2.0.

In another embodiment of the invention, the segment, in case of parallel projection onto the raster of pixels $\alpha_{ij}$, comprises at least one row j or at least one column i. A preferred embodiment, in which the 3D impression is not noticeably impaired either, is given if, in case of parallel projection of a sufficiently large filter segment of at least one array of filter elements $\beta_{pq}$ onto at least one row j or at least one column i of the raster, at least 1.1/n' times and maximally 1.8/n' times the area of the respective row j or column i are covered by filter elements $\beta_{pq}$ that are essentially transparent to light of the entire visible spectrum, so that, because of these filter elements $\beta_{pq}$, transparent to light of the entire visible spectrum, always about 1.1 to 1.8 pixels $\alpha_{ij}$ are visible, on average, per visible segment of the raster relative to the pixel area.

In another preferred embodiment of the invention, the array is provided with at least one first continuous belt of transparent filters extending from one edge of the array to the opposite edge, and at least one second continuous belt of transparent filters extending from one edge of the array to the opposite edge, with the major extensions of these two belts on the array not being aligned in parallel with each other.

Major extension, in this context, means the line connecting two transparent filters of one and the same belt, located at opposite ends of the belts. In case that several transparent filters are located at one end of the belt, the term refers to the area centroid of the total area of these transparent filters.

Preferably, at least one of the continuous belts of transparent filters is parallel with the upper, lower, left or right edge of the respective array of filter elements $\beta_{pq}$ and/or parallel to the upper, lower, left or right edge of the raster of pixels $\alpha_{ij}$.

It is of advantage if many such continuous belts of transparent filters are provided.

It should be noted here that the arrangements according to the invention may, under certain circumstances, work with only two views $A_k$ presented; such circumstances are given if the above-mentioned quotient is close to the lower limit, at approximately 1.1/n'.

In another embodiment, at least some of the continuous belts of transparent filters are randomly distributed over the array, provided that the said belts are aligned in parallel with each other. As an alternative it is also possible that at least some of the continuous belts of transparent filters are arranged on the array at periodic distances from each other, provided that the said belts are aligned in parallel with each other, wherein preferably every $m^{th}$ row q (with m>1) or every $m^{th}$ column p (with m>1) of the respective array forms such a continuous belt of transparent filters.

In a special embodiment it is provided that, in case of parallel projection of one—but not necessarily each—continuous belt of transparent filters onto the raster of pixels $\alpha_{ij}$ (in viewing direction), the pixels $\alpha_{ij}$ that are at least partially covered by transparent filters are predominantly such that render, for a predominant part or exclusively, bits of partial information from one and the same view $A_k$. However, it is also possible that several of the pixels $\alpha_{ij}$ that are at least partially covered by transparent filters are such that render bits of partial information from at least two different views $A_k$.

For all arrangements according to the invention, the assignment of bits of partial information from the views $A_k$ (k= 1 . . . n) to pixels $\alpha_{ij}$ of position i,j is preferably performed according to the equation $$k = i - c_{ij} \cdot j - n \cdot IntegerPart\left[\frac{i - c_{ij} \cdot j - 1}{n}\right],$$

in which i denotes the index of a pixel $\alpha_{ij}$ in a row of the raster, j the index of a pixel $\alpha_{ij}$ in a column of the raster, and k the consecutive number of the view $A_k$ (k=1 . . . n) from which the partial information to be rendered on a particular pixel $\alpha_{ij}$ originates. n is the total number of views $A_k$ (k=1 . . . n) used, and $c_{ij}$ is a selectable coefficient matrix for combining or mixing on the raster the various bits of partial information originating from the views $A_k$ (k=1 . . . n). The function IntegerPart delivers the greatest integral number that does not exceed the argument put in brackets in the equation.

Further, the filter elements $\beta_{pq}$ of the filter arrays intended are combined into a mask image depending on their transmission wavelength/their transmission wavelength range/their transmittance $\lambda_b$, according to the equation $$b = p - d_{pq} \cdot q - n_m \cdot IntegerPart\left[\frac{p - d_{pq} \cdot q - 1}{n_m}\right],$$

in which p denotes the index of a filter element $\beta_{pq}$ in a row of the respective array and q the index of a filter element $\beta_{pq}$ in a column of the respective array. b is an integral number that defines one of the intended transmission wavelengths/transmission wavelength ranges or transmittances $\lambda_b$ for a filter element $\beta_{pq}$ in the position (p,q) and may adopt values between 1 and $b_{max}$, $b_{max}$ being a natural number greater than 1. $n_m$ is an integral value greater than zero that preferably is the total number k of the views $A_k$ displayed in the combination picture, and $d_{pq}$ is a selectable mask coefficient matrix for varying the generation of a mask picture. The function IntegerPart has been defined above.

For the example embodiments described below, corresponding mask coefficient matrices $d_{pq}$ or coefficient matrices $c_{ij}$ could be given. This is omitted, however, for the sake of brevity.

Preferably, exactly one array of filter elements $\beta_{pq}$ is provided, and the distance z between the said array and the raster of pixels $\alpha_{ij}$, measured normal to the raster, is defined according to the following equation:

$$\frac{p_d}{s_p} = \frac{d_a \pm z}{z},$$

wherein $s_p$ denotes the mean horizontal distance between two neighboring pixels $\alpha_{ij}$. If the filter array, in viewing direction or in a direction normal to the raster, is located before the raster of pixels $\alpha_{ij}$, z is subtracted from $d_a$; if the filter array is located behind it, z is added to $d_a$, $p_d$ is the mean interpupillary distance of an observer, and $d_a$ is a selectable viewing distance.

Typical distances z are approximately within a range from 1 mm to 25 mm; other distances, especially greater ones, are feasible just as well, though.

In an advantageous embodiment, all filter elements provided on the filter array or filter arrays are of equal size. In this connection, the area of a filter or a filter element may be between several thousand square micrometers and several square millimeters, as a rule. The filter elements or filters $\beta_{pq}$ have polygonal, preferably rectangular outlines. The outlines may just as well include curved lines, though.

Other shapes are also feasible for the pixels $\alpha_{ij}$, such as, for example, polygonal shapes, or a herringbone pattern of stripes as in a so-called dual-domain display. This implies that the number of filter elements $\beta_{pq}$ provided on a filter array may deviate greatly from the number of pixels $\alpha_{ij}$.

In case no random arrangement of transparent filter belts is provided, the filter elements $\beta_{pq}$ provided on the filter array or filter arrays preferably have an essentially periodic arrangement.

In another advantageous embodiment, the light propagation directions for the bits of partial information rendered on the pixels $\alpha_{ij}$ are specified depending on their wavelength/ their wavelength range.

In another embodiment, on at least one of the arrays of filter elements in at least one row q of the array, immediately adjacent transparent filters border on a different number of immediately adjacent transparent filters in row q−1 than in row q+1. In this way, the transitions between views during a movement of the observer are influenced.

Preferably, each of the filter arrays provided is static and invariable in time, and essentially arranged in a fixed position relative to the raster of pixels $\alpha_{ij}$, i.e. the imaging device.

In another, more special embodiment of the above-mentioned arrangements according to the invention, at least one pixel $\alpha_{ij}$ renders image information that is a mix of bits of partial information from at least two different views $A_k$, such as, for example, by means of any of the methods described in WO 03/024112 by the present applicant.

In the arrangements according to the invention as described above, the imaging device may be, for example, an LC display, a plasma display, or an OLED screen. This is not to exclude that the imaging device may also be a device of any other kind.

In special applications it may be desirable, in addition, that the arrangement can be switched between a 2D and a 3D mode, either totally or partially—capability for which each of the arrangements described so far is eligible. For this purpose, a translucent image display device such as, for example, an LC display, and exactly one array of filter elements are provided, the latter being arranged (in viewing direction) between the image display device and a planar illumination device. Also provided is a switchable diffusing plate arranged between the image display device and the filter array, so that in a first mode of operation, in which the switchable diffusing plate is switched to be transparent, a spatial impression is created for the observer(s), whereas in a second mode of operation, in which the switchable diffusing plate is switched to be at least partially diffusing, the action of the array of filter elements is cancelled out to the greatest possible extent, so that the scattered light provides for a largely homogeneous illumination of the image display device and two-dimensional image contents can be displayed on it with full resolution. Accordingly, in the said second mode, no light propagation directions are defined for those partial areas in which the diffusing plate is switched to be diffusing, so that both eyes of the observer essentially see the same image information. Advantageously, the respective 2D positions on the imaging device are made to render two-dimensional image information only rather than an image that is composed of several views.

For switching between 2D and 3D, moreover, at least one array of filter elements may be provided whose pixels, or at least part of them, act as wavelength or gray level filters and which are of an electrochromic or photochromic design, the said array exhibiting, in a first (3D) mode of operation, a filter array structure suitable for three-dimensional display, using especially the pixels of electrochromic or photochromic design, whereas in a second mode of operation the pixels of electrochromic or photochromic design are switched to be as transparent as possible, preferably more or less completely transparent to the entire visible spectrum.

The array may be provided with both wavelength or gray level filters of electrochromic or photochromic design and such having invariable transmission properties, the invariable filters being preferably designed to be essentially completely transparent to the entire visible spectrum.

BRIEF DESCRIPTION OF THE DRAWINGS

Below, the invention is described in detail with reference to drawings, in which:

FIG. 1c is a schematic illustration of the embodiment of arrangements according to the invention, FIG. 2 shows a possible image combination for creating a spatial impression in conjunction with a filter array of the first embodiment, FIG. 3 FIG. 5 shows another example of the image combination, FIG. 9 shows yet another example of the image combination, FIG. 19 shows another example of the image combination, FIG. 23 shows another example of the image combination, FIG. 27 shows another example of the image combination, FIG. 30 shows examples of pixels or partial areas of pixels possibly visible to an observer's two eyes, based on the conditions shown in FIG. 27 and FIG. 28, FIG. 31 shows yet another example of the image combination, FIG. 41 shows another example with an image combination compiled from six views.

DETAILED DESCRIPTION OF THE INVENTION

The drawings are not to scale; they may be greater or smaller than natural size. Some of the drawings are schematic illustrations of the principle, and some others show segments of the respective object only.

Figure 1A:
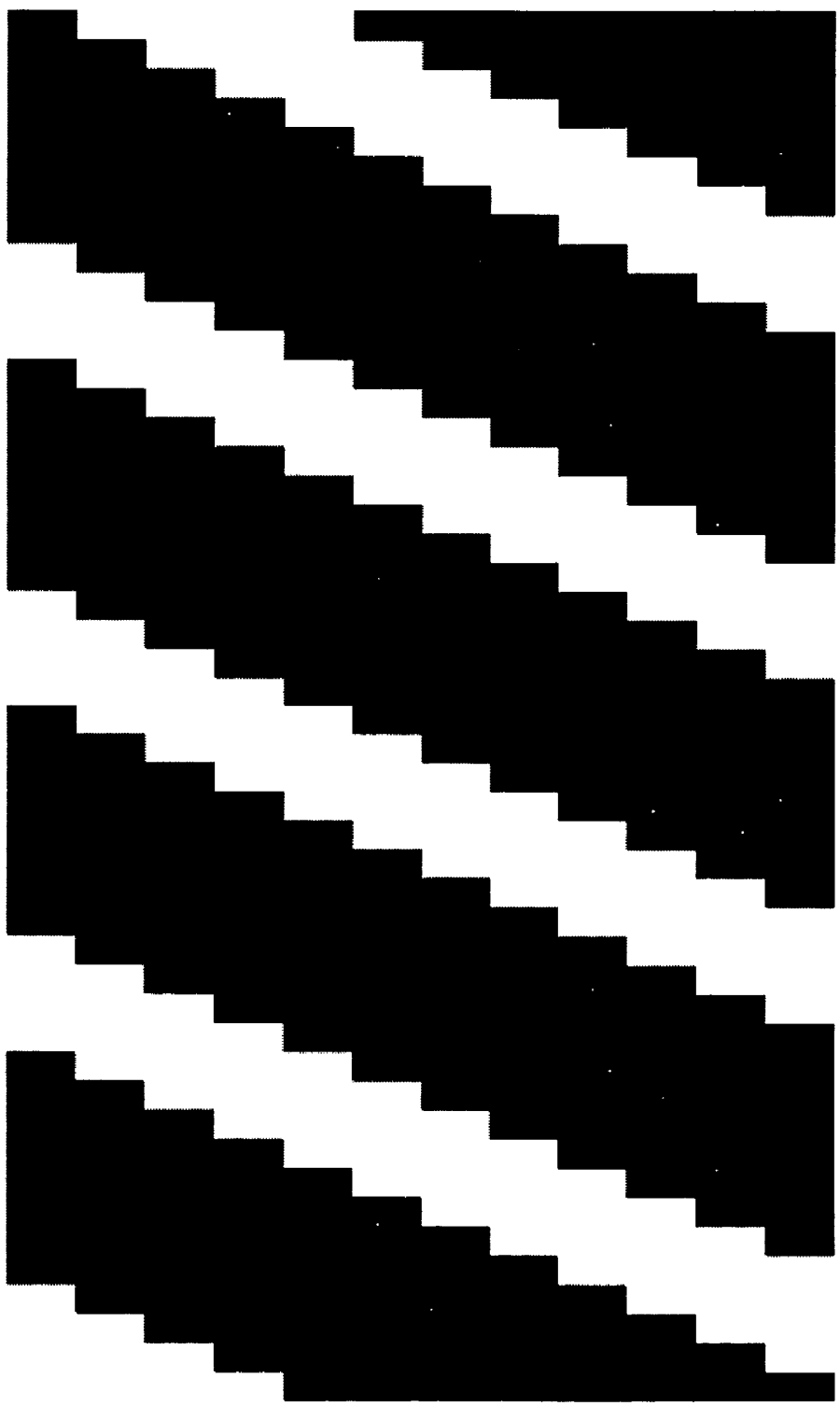
FIG. 1a shows a filter array in a first embodiment of the invention.
Figure 1B:
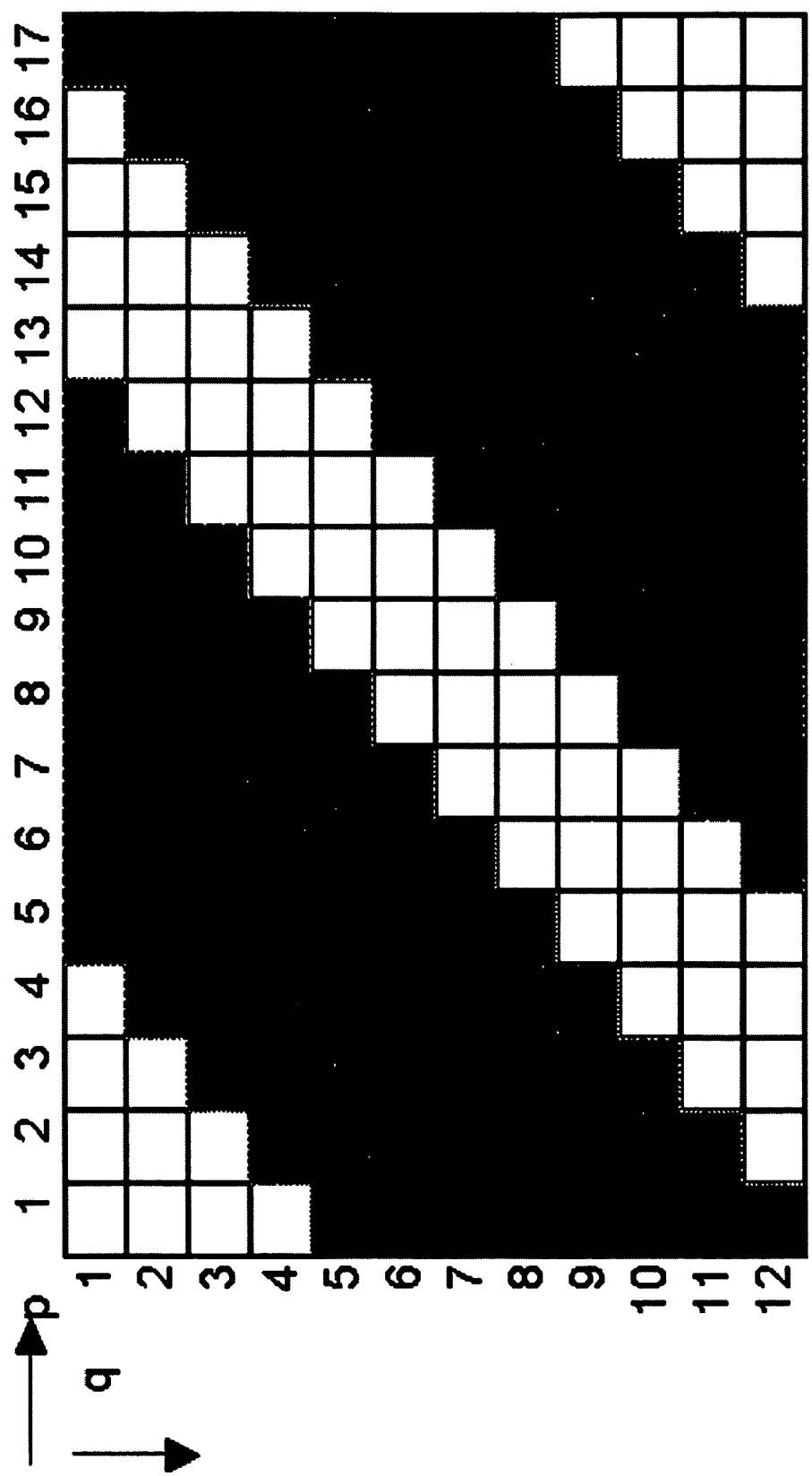
FIG. 1b schematically illustrates the composition of transparent filter segments from several transparent filter elements.

FIG. 1a shows a segment of a filter array in a first embodiment of the arrangement according to the invention. The filter array is composed of a great number of wavelength filters. The filters or filter elements provided here are only such that are either essentially transparent or opaque to the visible spectral range. As shown in FIG. 1b, the transparent filter segments of the filter array known from FIG. 1a are composed of several transparent filter elements. In FIG. 1b, the dimensions of the (smallest) transparent filter elements are approximately 0.0997151 mm wide by 0.2991453 mm high, if the raster of pixels used is a 15.1" LC display of the LG type with a resolution of 1024×768 pixels at a full-color pixel size of 0.3 mm×0.3 mm. The dimensions of the assembled transparent filter segments, shown in FIG. 1a, are thus given inherently. The filter array extends approximately over the same area as the active image area of an LC display, or of the imaging device in general.

Reference is made below to FIG. 1c, in which schematically indicated observer eyes 3 look at a filter array 2. If the filter array 2 is arranged, as shown in FIG. 1c, in front of a raster 1 of rows j and columns i of pixels $\alpha_{ij}$, the arrangement according to the invention is implemented in an embodiment in which the quotient of the sum of areas of the filter elements $\beta_{pq}$ that are largely transparent to light of essentially the entire visible spectrum and the sum of areas of all filter elements $\beta_{pq}$ of the respective array has a value that is between the quotient $Q1=1.1/n'$ and the quotient $Q2=1.8/n'$, so that, due to the filter elements $\beta_{pq}$ transmissive to light of the entire visible spectrum, always about 1.1 to 1.8 pixels $\alpha_{ij}$ are visible, on average, per visible segment of the raster relative to the pixel area. The filter elements transmissive to light of specified wavelength ranges are designed as transparent filters.

With regard to this, an image assembled from four views according to the image combination rule illustrated in FIG. 2 is used on the raster of pixels. Here and in further drawings, the columns R, G, B denote red, green and blue subpixel columns (or also subpixel rows). Thus, in this case, the average number of different views n' displayed on the pixels $\alpha_{ij}$ per row i of the raster is n'=4.

If, for example, according to FIG. 1b, one selects a 12×12 field of the smallest filter elements whose raster is discernible here, it is evident that, on the (one) array provided, the quotient of the sum of areas covered by filter elements $\beta_{pq}$ largely transparent to light of essentially the entire visible spectral range and the sum of the areas covered by all filter elements $\beta_{pq}$ is 48/144=1/3. With n'=4, the said quotient 1/3 satisfies the requirement of lying between the quotient $Q1=1.1/n'=0.275$ and the quotient $Q2=1.8/n'=0.45$.

Figure 3:
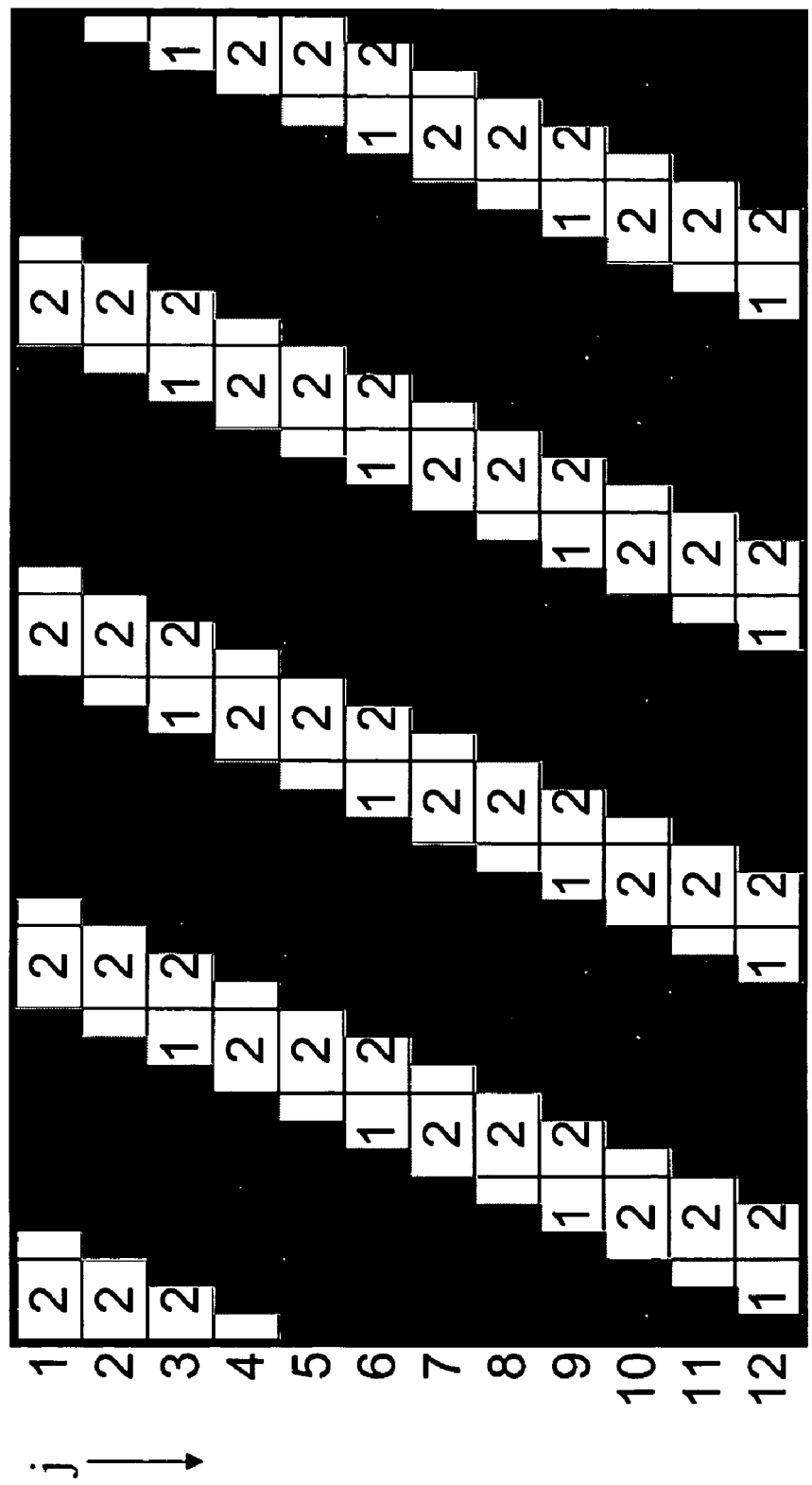
Figure 4:
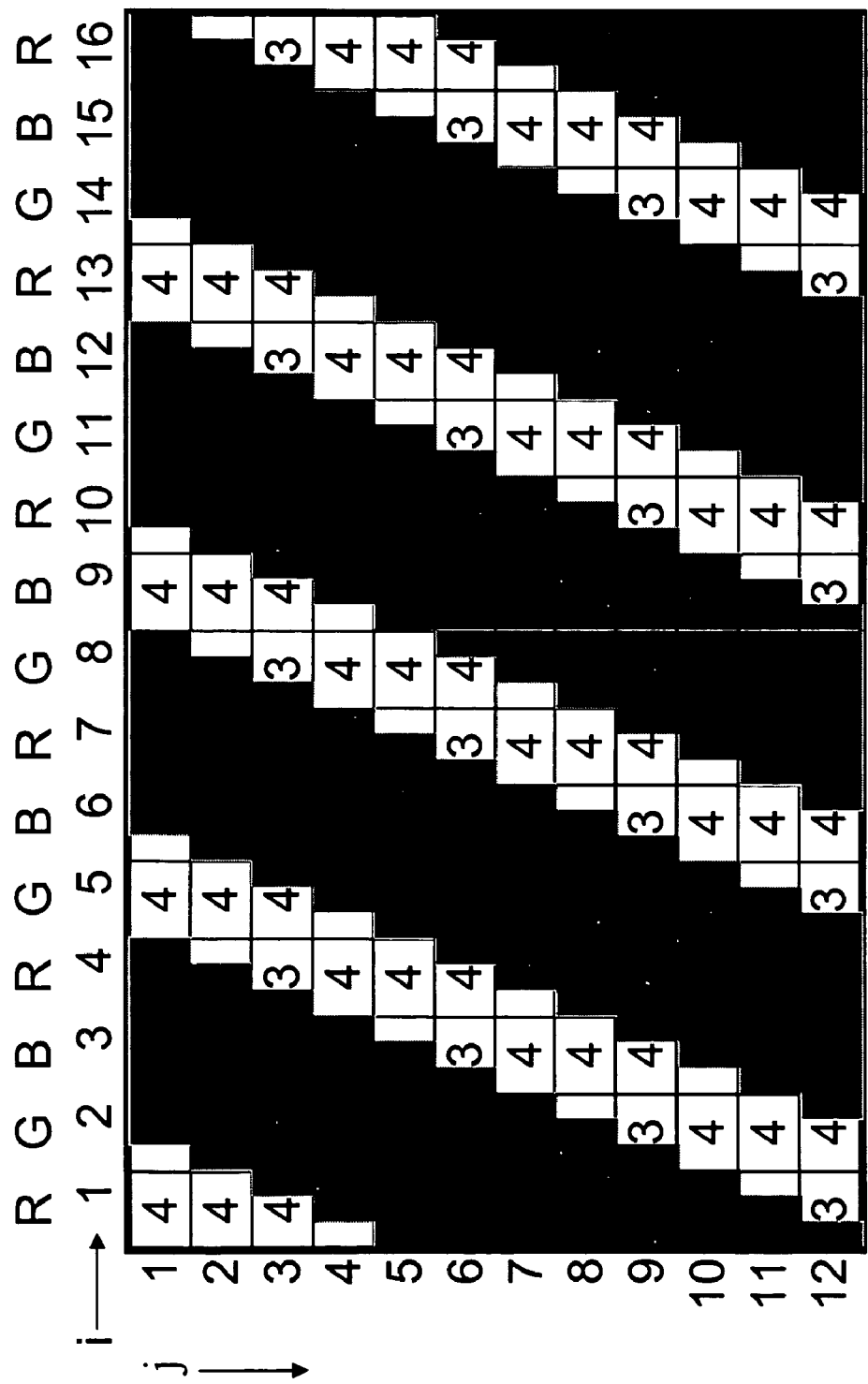
FIG. 4 shows examples of pixels or partial areas of pixels possibly visible to an observer's two eyes, based on the conditions shown in FIG. 1a and FIG. 2.

FIG. 3 and FIG. 4 show examples of pixels or partial areas of pixels possibly visible to an observer's two eyes, based on the conditions shown in FIG. 1a and FIG. 2. From these it is evident that, because of the filter elements $\beta_{pq}$ that are transmissive to the complete visible spectrum, i.e. the transparent filters, always about 1.1 to 1.8 pixels $\alpha_{ij}$, on average, are visible per visible raster segment with reference to the pixel area, or, more precisely, about 1.33 pixels $\alpha_{ij}$ in this case. For example, a visible share of about one third of the area of the pixel adjacent on the right borders on the top left pixel visible at the location (1,1) in FIG. 3.

Because of the visibility conditions prevailing here (see FIG. 3), an observer sees, e.g., a selection comprising the views $A_k$ with k=1, 2, 3, in which the visible area shares relate as 3:8:1. The observer's other eye, the visibility conditions of which are exemplified in FIG. 4, would see, e.g., a selection comprising the views $A_k$ with k=3, 4, 1, in which the visible area shares also relate as 3:8:1.

It may be noted here that, because of the visibility conditions of the arrangements according to the invention, the readability of 2D text relative to 3D arrangements and methods known in prior art is further improved.

Figure 5:
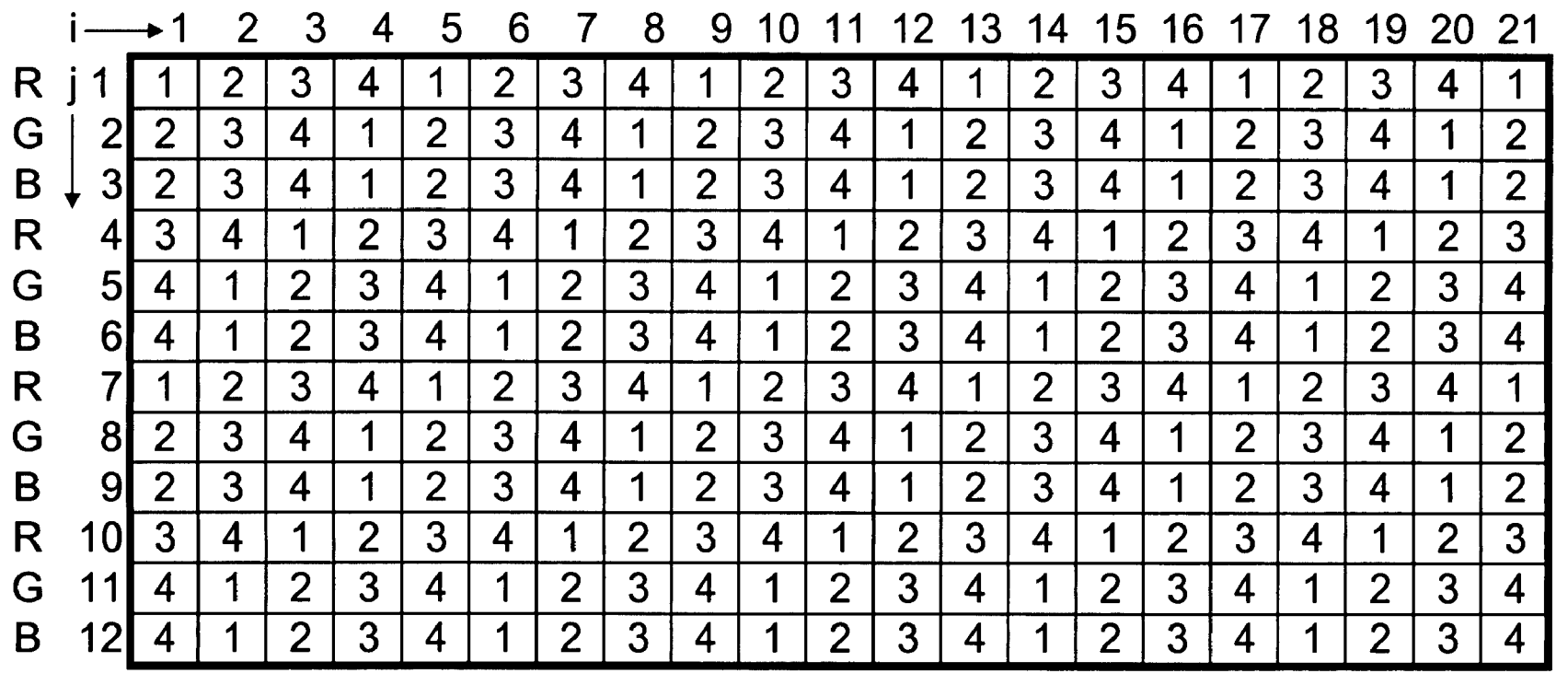
Figure 6:
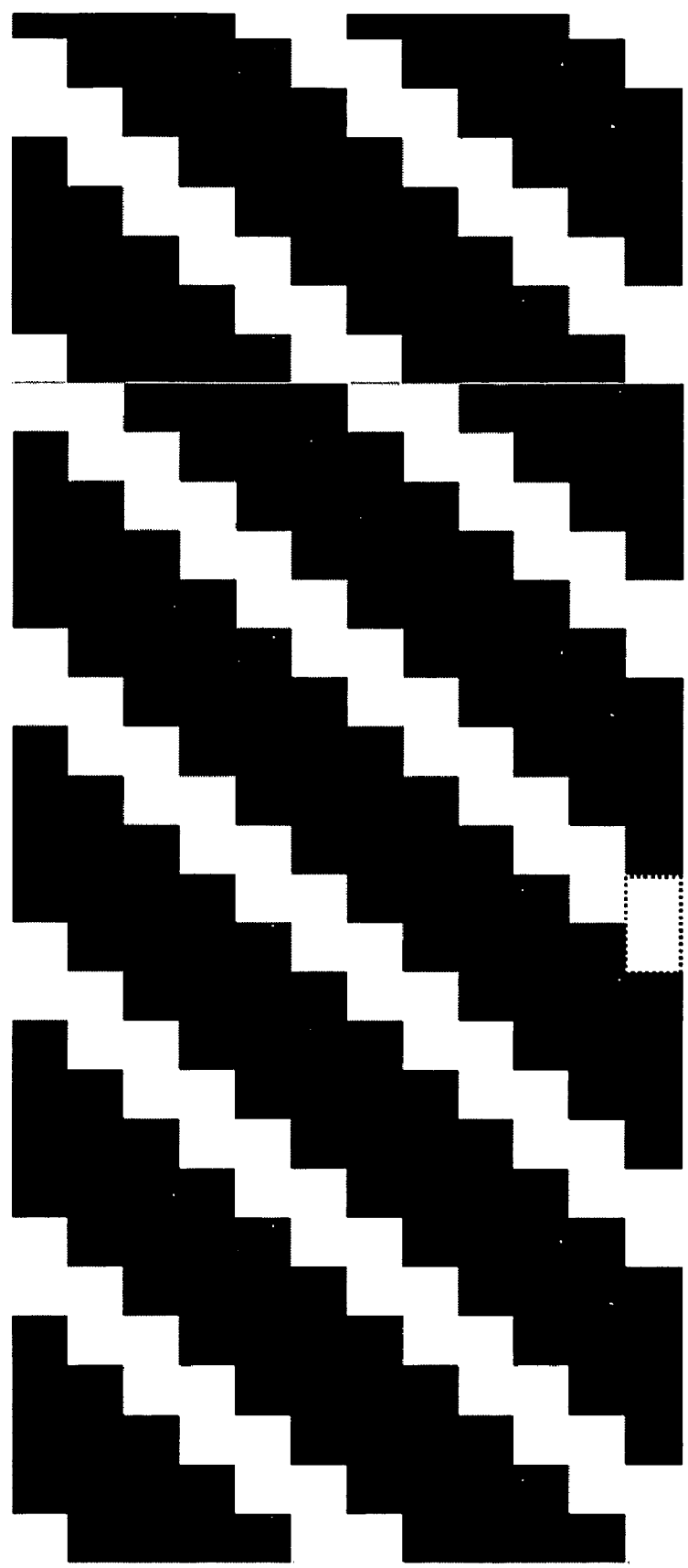
FIG. 6 shows a filter array that is excellently suitable for spatial display in conjunction with the image combination rule illustrated in FIG. 5, FIG. 7 and FIG. 8 show examples of pixels or partial areas of pixels possibly visible to an observer's two eyes, based on the conditions shown in FIG. 5 and FIG. 6.

FIG. 5 shows another example of the image combination, which is particularly suitable for a display intended for mobile use, such as that of a PDA (Personal Digital Assistant) or a mobile phone. FIG. 6 illustrates a filter array that is, in conjunction with the image combination rule illustrated in FIG. 5, excellently suitable for three-dimensional display, and that allows the implementation of an embodiment in which, in case of the parallel projection of a sufficiently large filter segment of at least one array of filter elements $\beta_{pq}$ onto at least one row j or at least one column i of the raster, at least 1.1/n' times, but at most 1.8/n' times the area of the respective row j or column i is covered by filter elements $\beta_{pq}$ essentially transmissive to light of the complete visible spectrum, so that, because of these transmissive filter elements $\beta_{pq}$, always about 1.1 to 1.8 pixels $\alpha_{ij}$ are visible, on average, per visible raster segment with reference to the pixel area. The filter elements transmissive to light of specified ranges are also designed as transparent filters.

Here again, with reference to FIG. 5, the average number of different views displayed on the pixels a per row i of the raster is n'=4.

Figure 7:
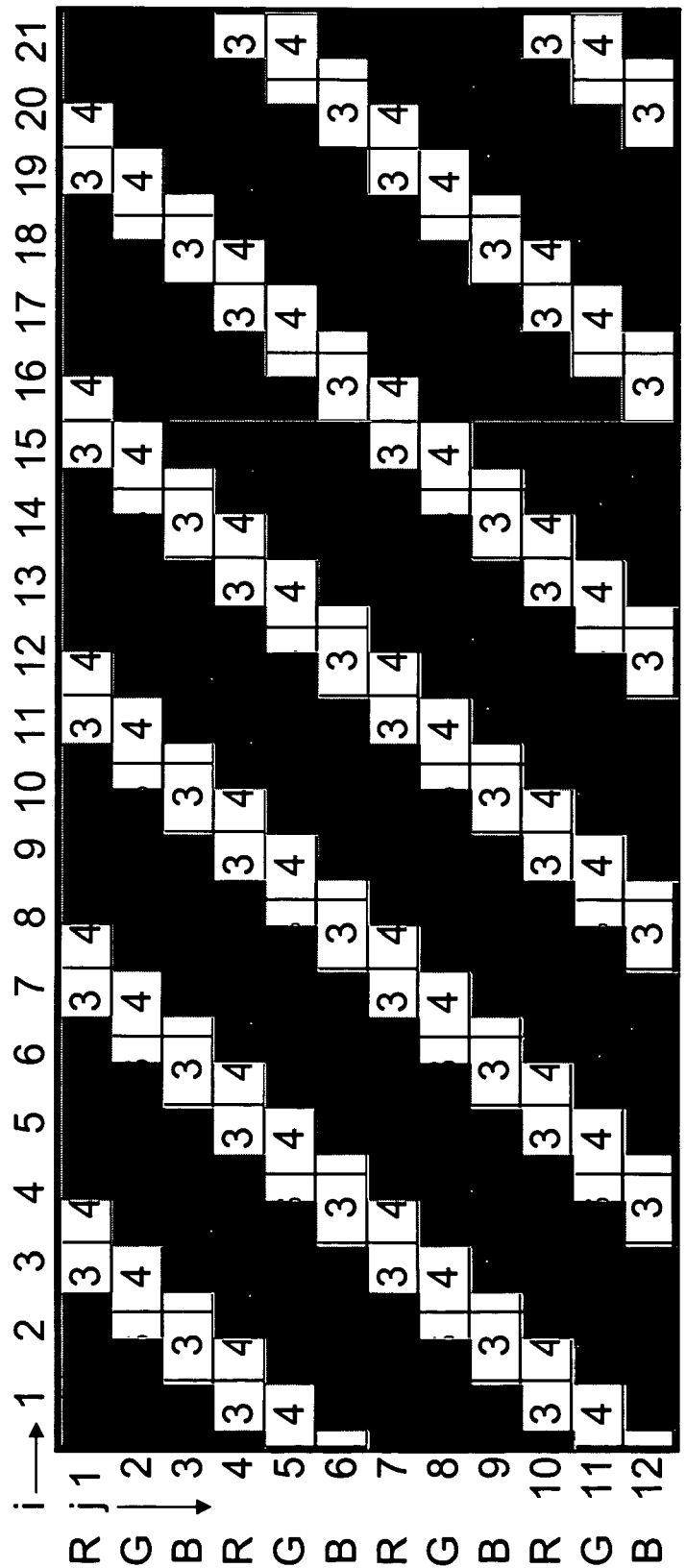
Figure 8:
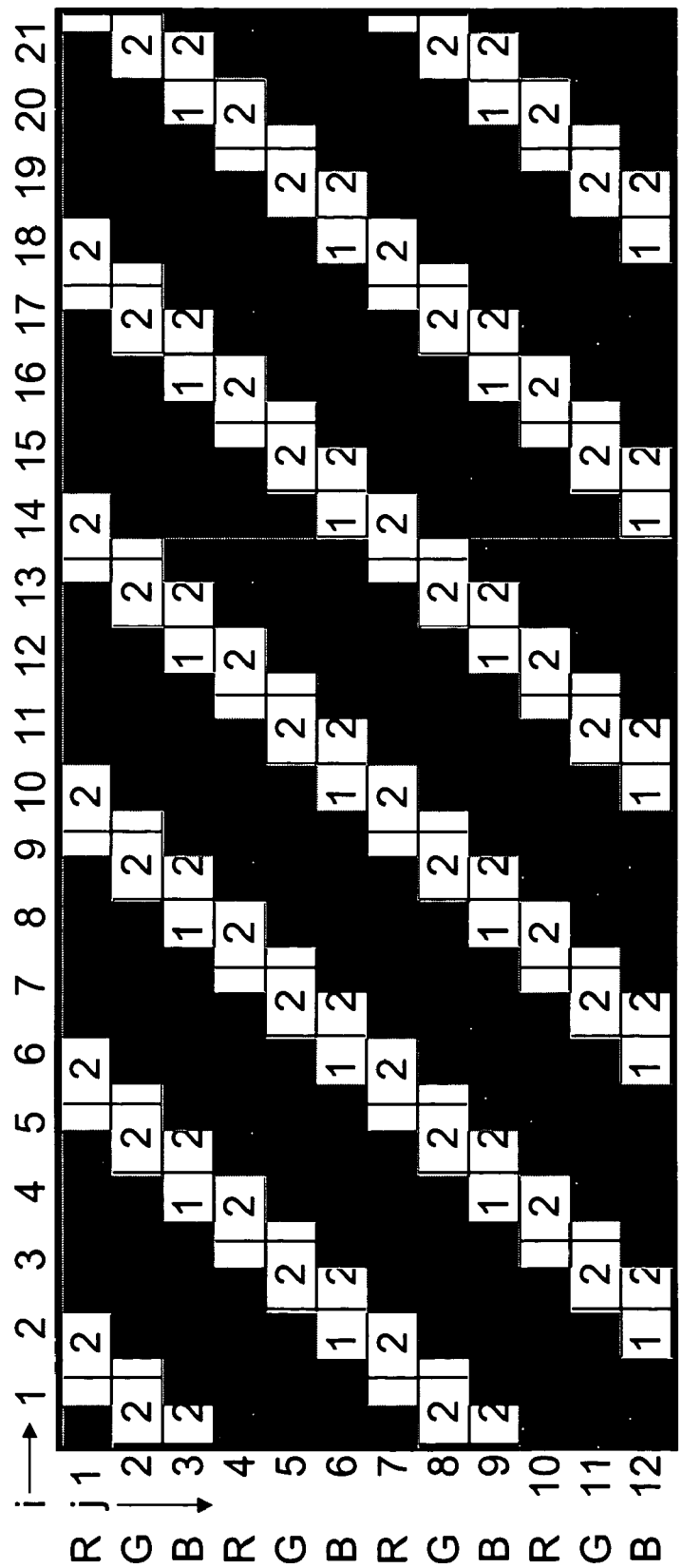

Whereas FIG. 7 and FIG. 8 show examples of pixels or partial areas of pixels possibly visible to an observer's two eyes, based on the conditions shown in FIG. 5 and FIG. 6 or with reference to a relative arrangement as shown in FIG. 1c, the first-named drawings also serve to illustrate the properties required.

In so far as the distance z between the filter array and the raster of pixels is not too great, i.e. about less than one percent referred to the selected viewing distance $d_a$ of the observer's eyes 3, the drawings FIG. 7 and FIG. 8 approximately illustrate quasi-parallel projections of the filter array onto the raster of pixels $\alpha_{ij}$.

If one regards, in FIG. 7 or FIG. 8, these (quasi-)parallel projections of the respective filter segment shown (which is assumed to be sufficiently large) of the array of filter elements onto column i=1 of the raster of pixels $\alpha_{ij}$, it is evident that about one third of the area of column i is covered by transparent filters. This satisfies the requirement that at least 1.1/n' times and at most 1.8/n' times the area of the respective column i is covered by transparent filters, as 1.1/4<1/3<1.8/4.

Accordingly, because of the said transparent filter elements $\beta_{pq}$, always about 1.1 to 1.8—or, in this case, precisely 1.33— pixels $\alpha_{ij}$ are visible, on average, per visible raster segment with reference to the pixel area.

Analogously, this could be shown for the rows.

As a peculiarity of the image combination illustrated in FIG. 5 it should be noted that it features RGB color subpixel rows rather than RGB color subpixel columns as in many LCD screens. An image constructed in that way is provided, for example, in a PDA (Personal Digital Assistant) of the make Compaq iPAQ 3600 Pocket PC; this PDA make is excellently suitable for 3D display in conjunction with the applications outlined before. Here, the filter dimensions are, for example, 0.319607 mm wide×0.079922 mm high, corresponding to the broken-line rectangle in FIG. 6.

Figure 10:
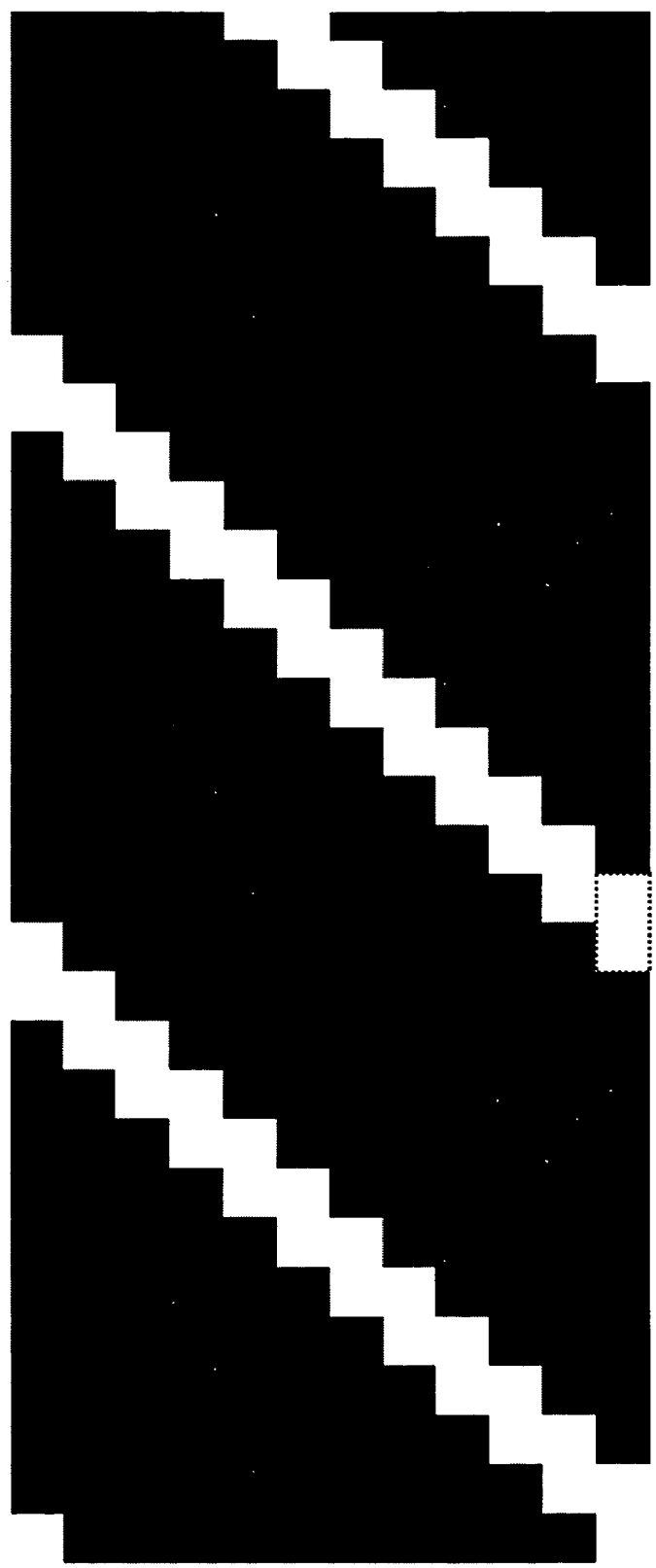
FIG. 10 shows a filter array that is excellently suitable for spatial display in conjunction with the image combination rule illustrated in FIG. 9, FIG. 11 and FIG. 12 show examples of pixels or partial areas of pixels possibly visible to an observer's two eyes, based on the conditions shown in FIG. 9 and FIG. 10.

In the sense of the embodiment just described, FIG. 9 shows another example of the image combination, and FIG. 10 shows a filter array that is excellently suitable for three-dimensional displays in conjunction with the image combination rule illustrated in FIG. 9 here again, the characteristic requirements for the arrangement according to the invention are satisfied, which can easily be proved. The raster of pixels $\alpha_{ij}$ used here is, for example, a plasma display of the make Pioneer PDP 503 MXE. Here, the filter dimensions are, e.g., 0.379646 mm wide×0.80442478 mm high, corresponding to the broken-line rectangle in FIG. 10.

Figure 11:
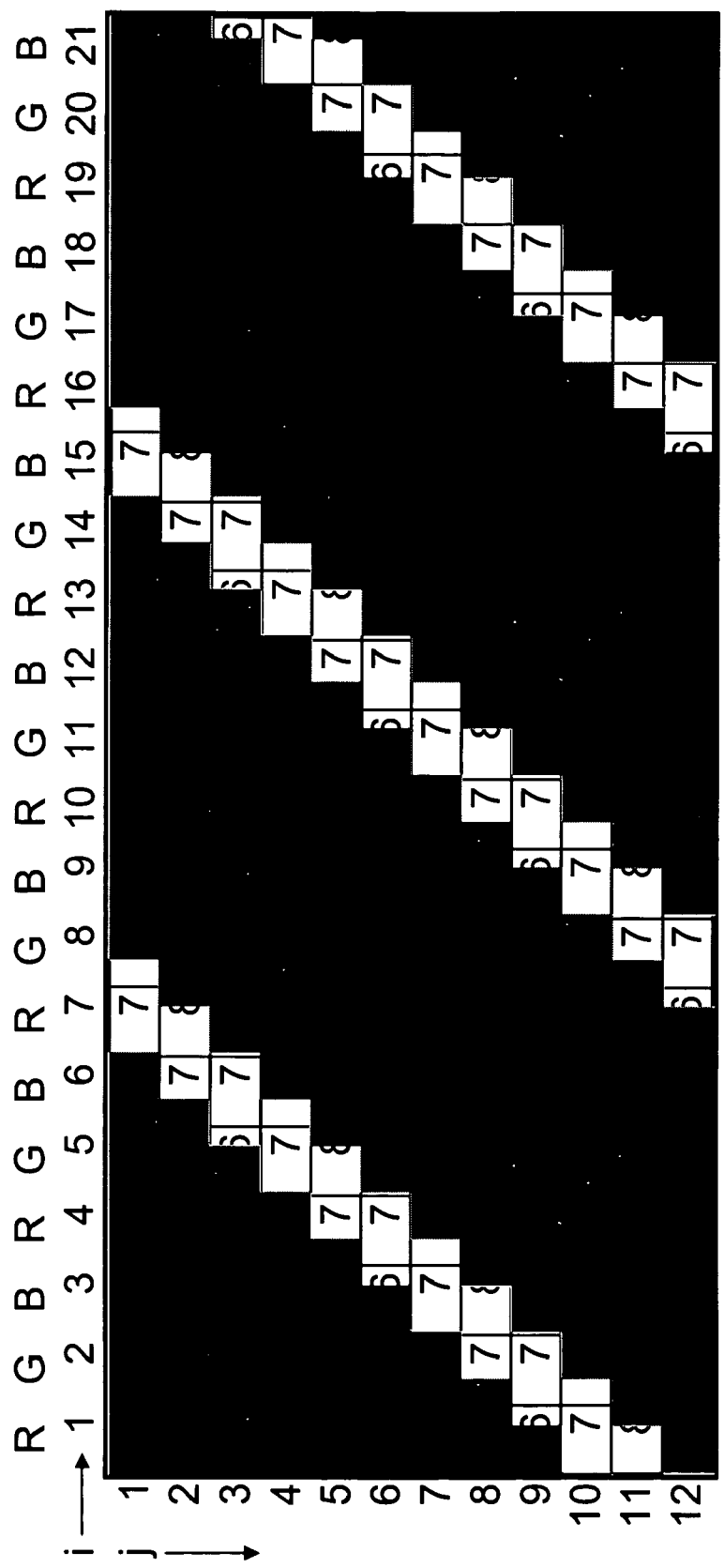
Figure 12:
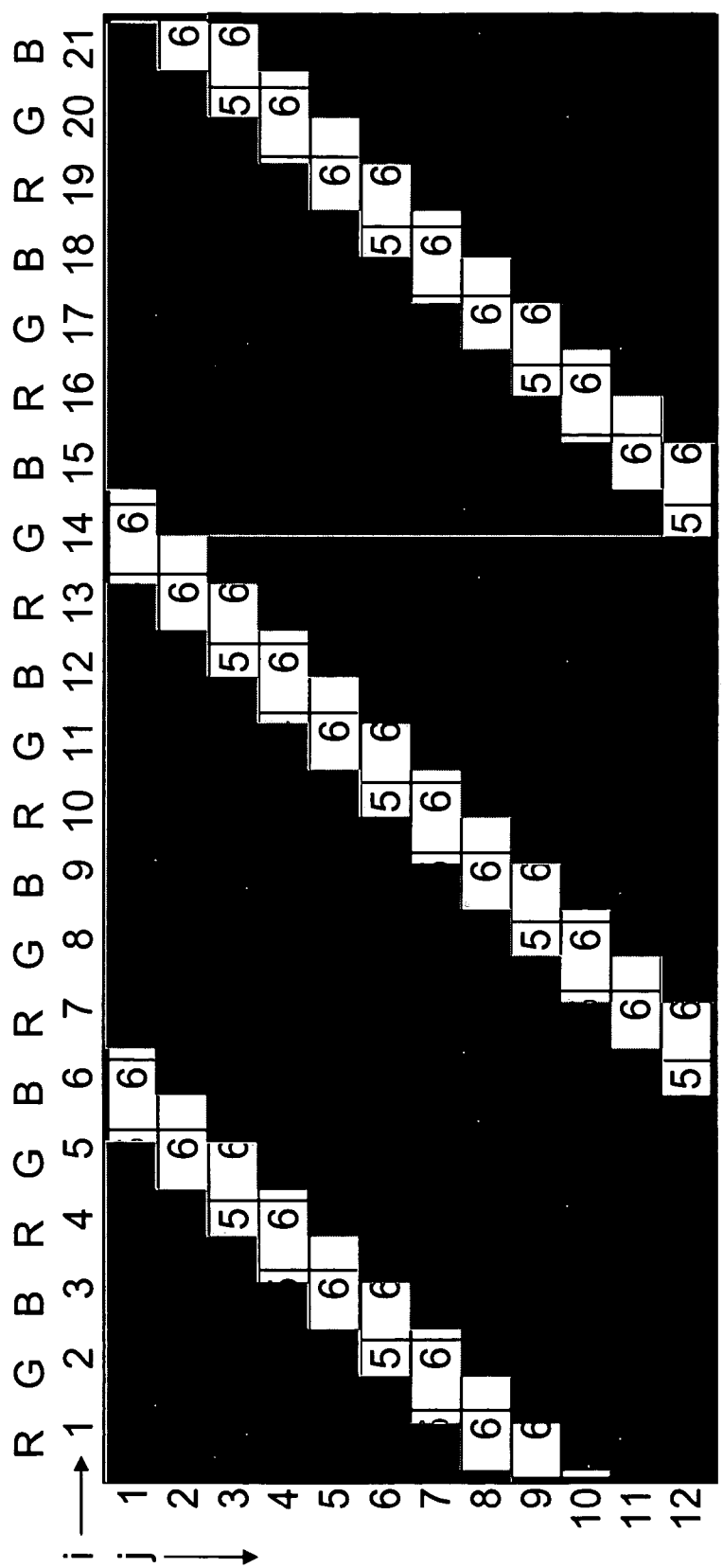

Finally, FIG. 11 and FIG. 12 show examples of pixels or partial areas of pixels possibly visible to an observer's two eyes, based on the conditions shown in FIG. 9 and FIG. 10.

Figure 13A:
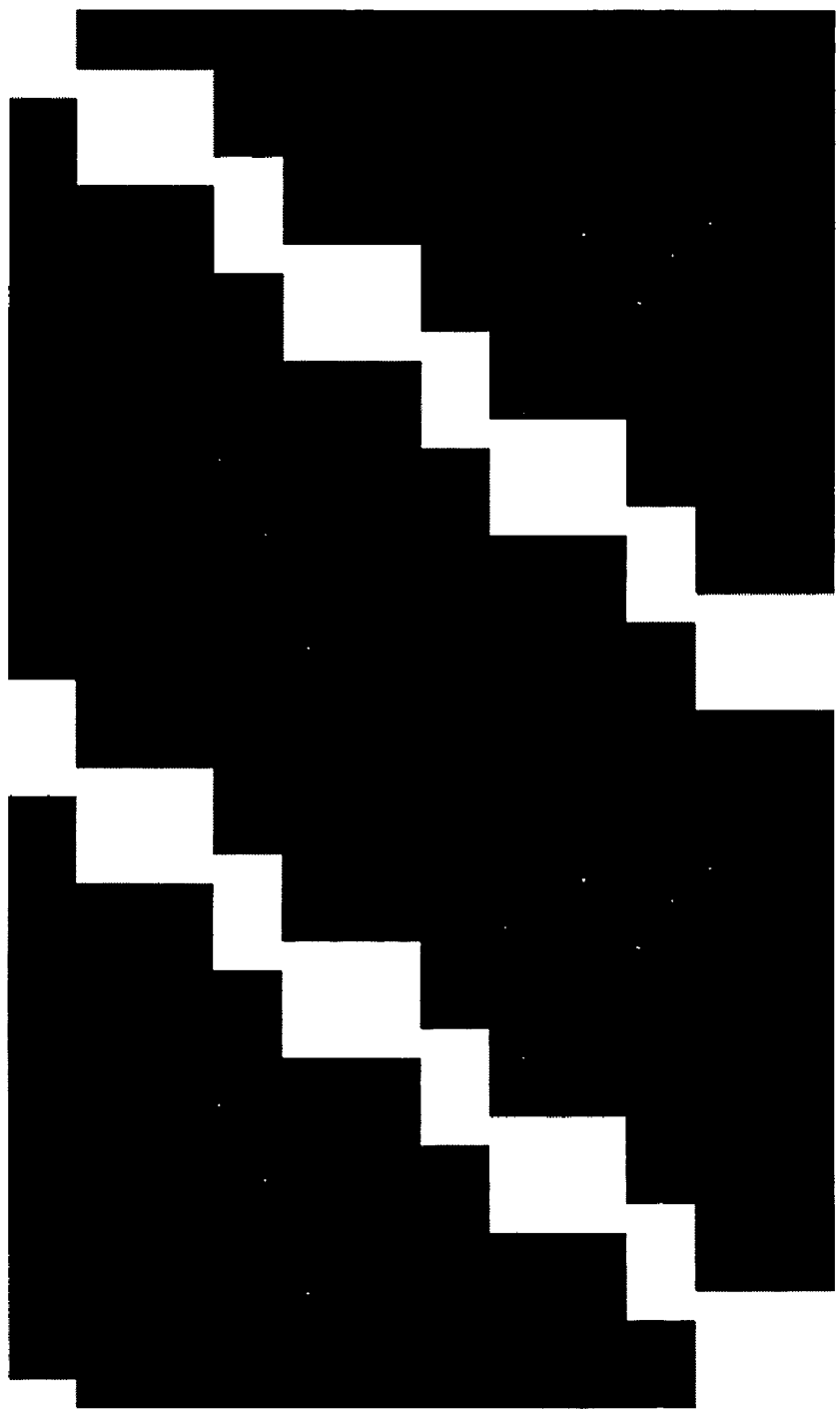
FIG. 13a shows a filter array in another embodiment of the invention, preferably to be applied with an image combination rule as illustrated in FIG. 9, FIG. 13b schematically illustrates the composition of transparent filter segments from several transparent filter elements, equivalent to the filter array shown in FIG. 13a, FIG. 14 shows an example of pixels or partial areas of pixels possibly visible to one eye of the observer, based on the conditions shown in FIG. 9 and FIG. 13a, FIG. 15 shows a filter array in another embodiment of the invention, preferably to be applied with an image combination rule as illustrated in FIG. 9.
Figure 14:
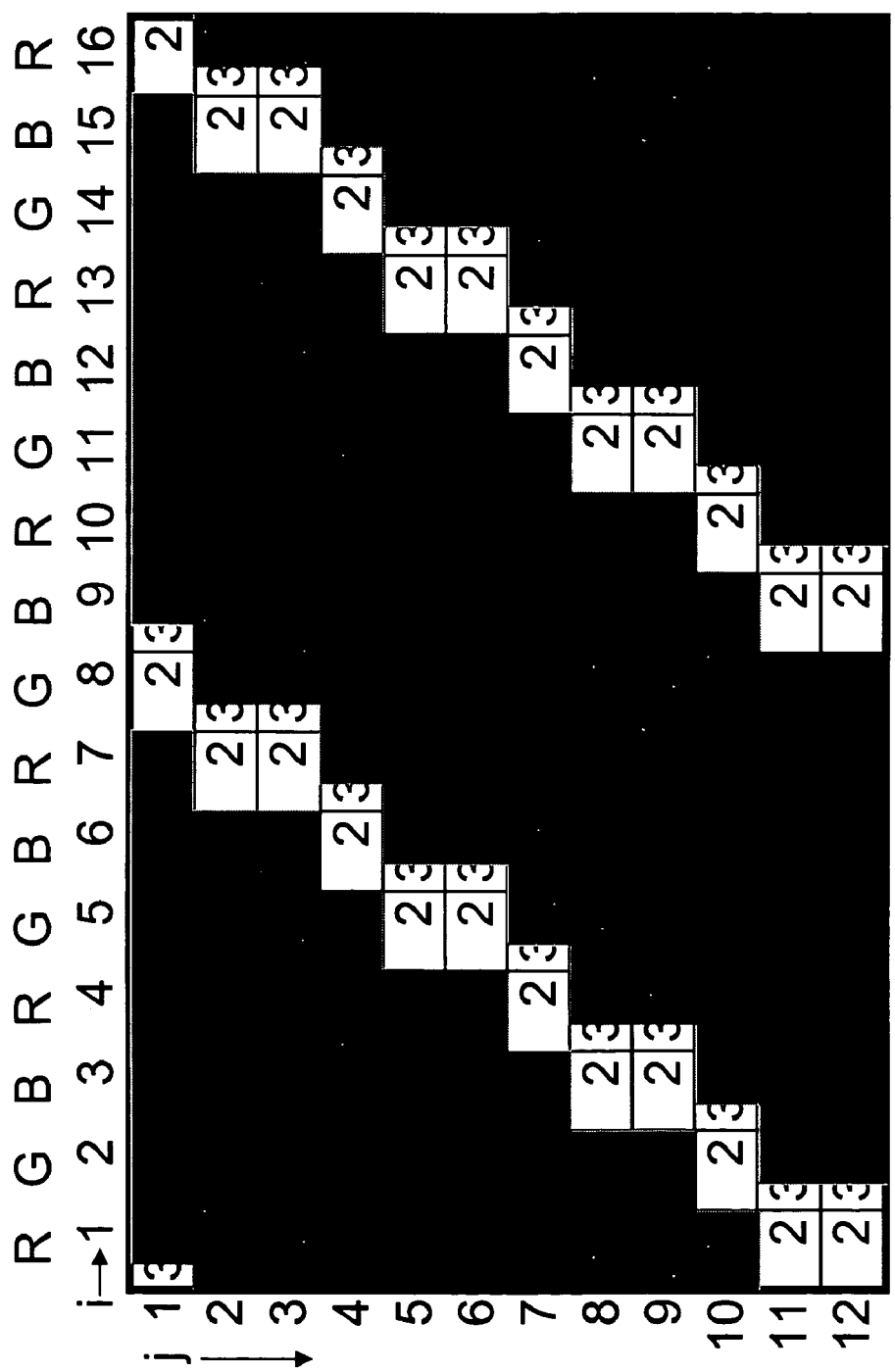

Yet another example of a filter array in the sense of the invention is shown in FIG. 13a. Preferably, this filter array should be used with an image combination rule according to FIG. 9. For easier understanding, FIG. 13b schematically illustrates the composition of transparent filter segments from several transparent filters or filter elements. The filter array shown in FIG. 13b is equivalent to that shown in FIG. 13a. In this respect, FIG. 14 is an example of the pixels or partial areas of pixels visible to one eye of the observer, based on the conditions shown in FIG. 9 and FIG. 13a.

Incidentally, the filter array illustrated in FIG. 13a or FIG. 13b implements the case that, on at least one of the arrays of filter elements provided, in at least one row q of the array, immediately neighbored transparent filters border on a different number of immediately neighboring transparent filters on row q−1 than on row q+1. For example, in row q=8 in FIG. 13b it is evident that the immediately neighboring four transparent filters shown border on four immediately neighboring transparent filters of row q+1=9, whereas they border on only one of the four immediately neighboring transparent filters of row q−1=7.

Figure 15:
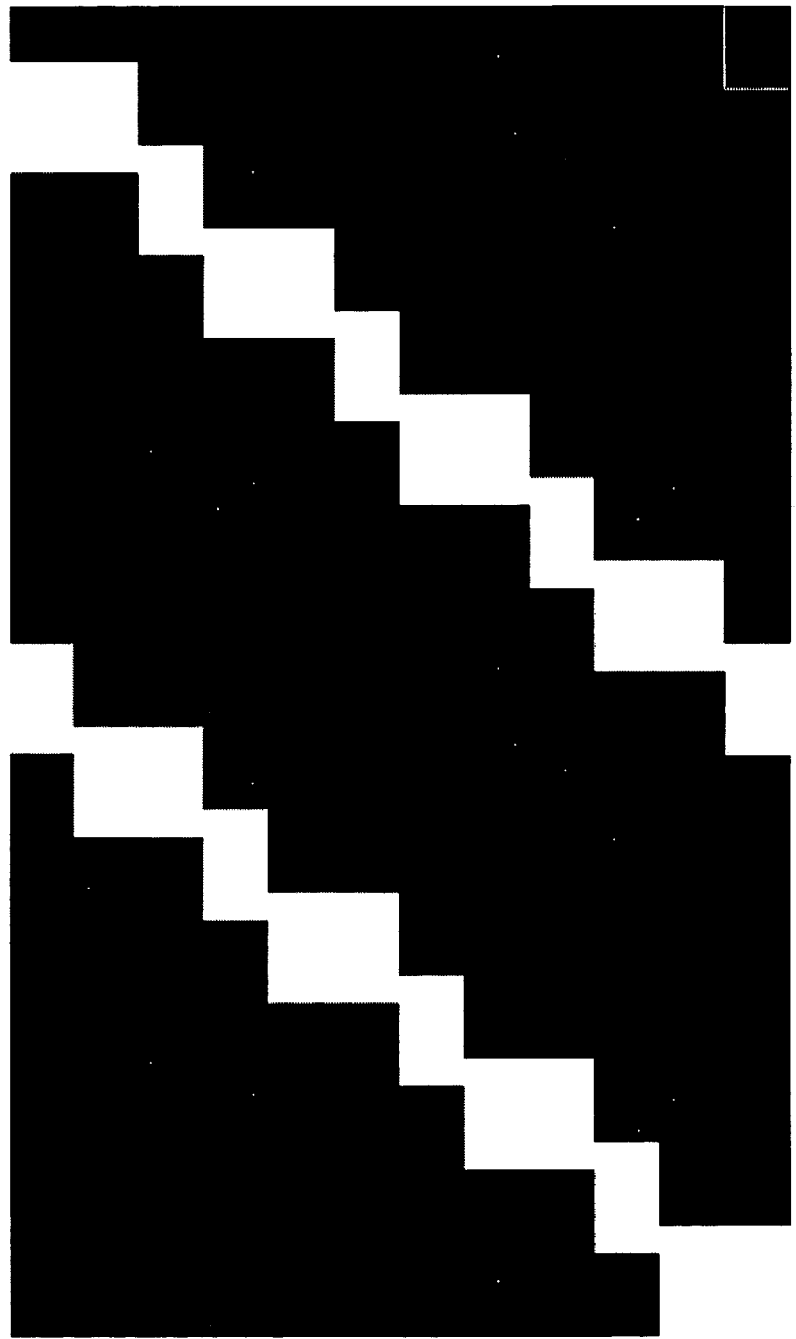

FIG. 15 shows another example of a filter array in the sense of the invention. Preferably, this filter array should also be used with an image combination rule according to FIG. 9.

Figure 16:
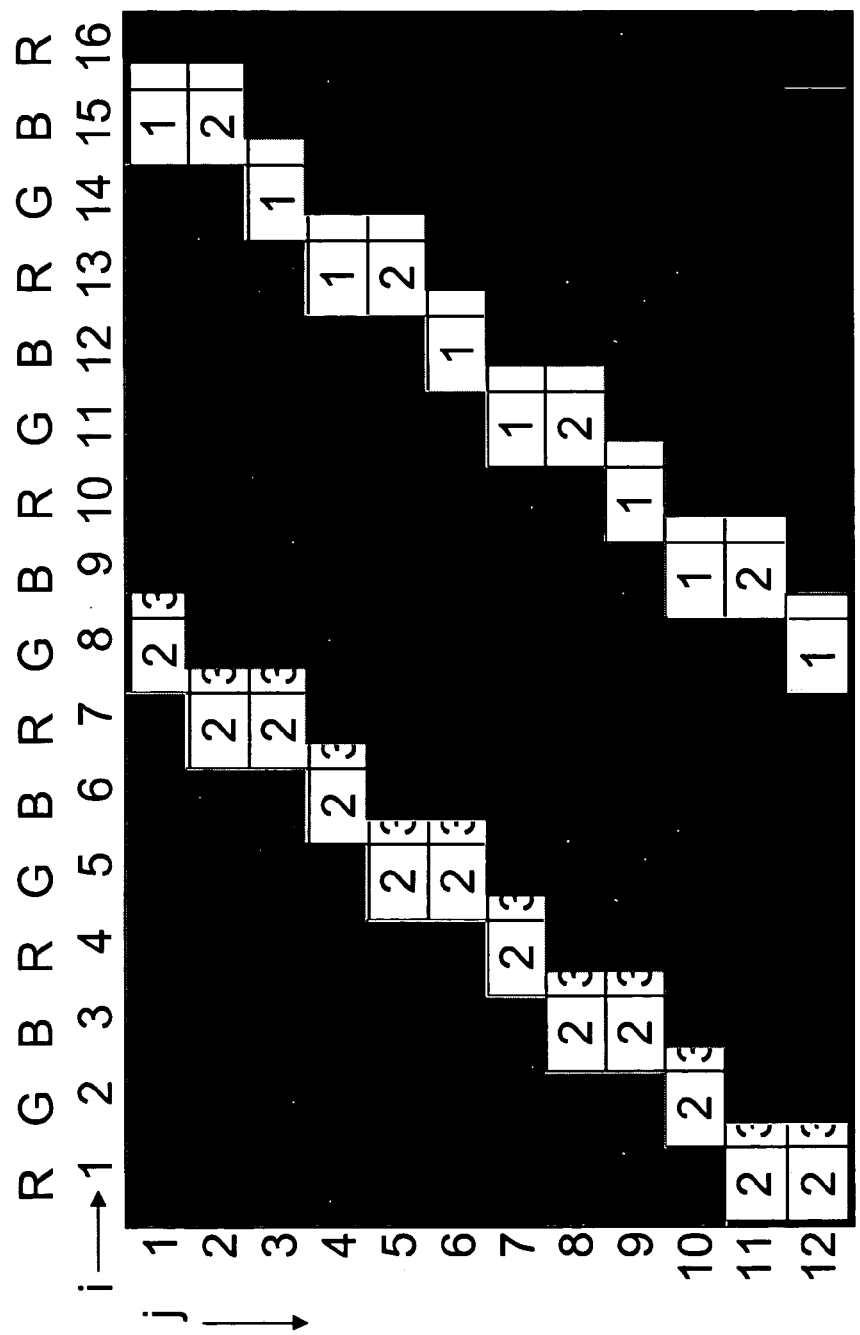
FIG. 16 shows an example of pixels or partial areas of pixels possibly visible to one eye of the observer, based on the conditions shown in FIG. 9 and FIG. 15.

FIG. 16 shows an example of the pixels or partial areas of pixels visible to one eye of the observer, based on the conditions shown in FIG. 9 and FIG. 15.

Incidentally, the filter array illustrated in FIG. 15 also implements the case that, on at least one of the arrays of wavelength or gray level filters provided, in at least one row q of the array, immediately neighbored transparent filters border on a different number of immediately neighboring transparent filters on row q−1 than on row q+1.

Figure 17:
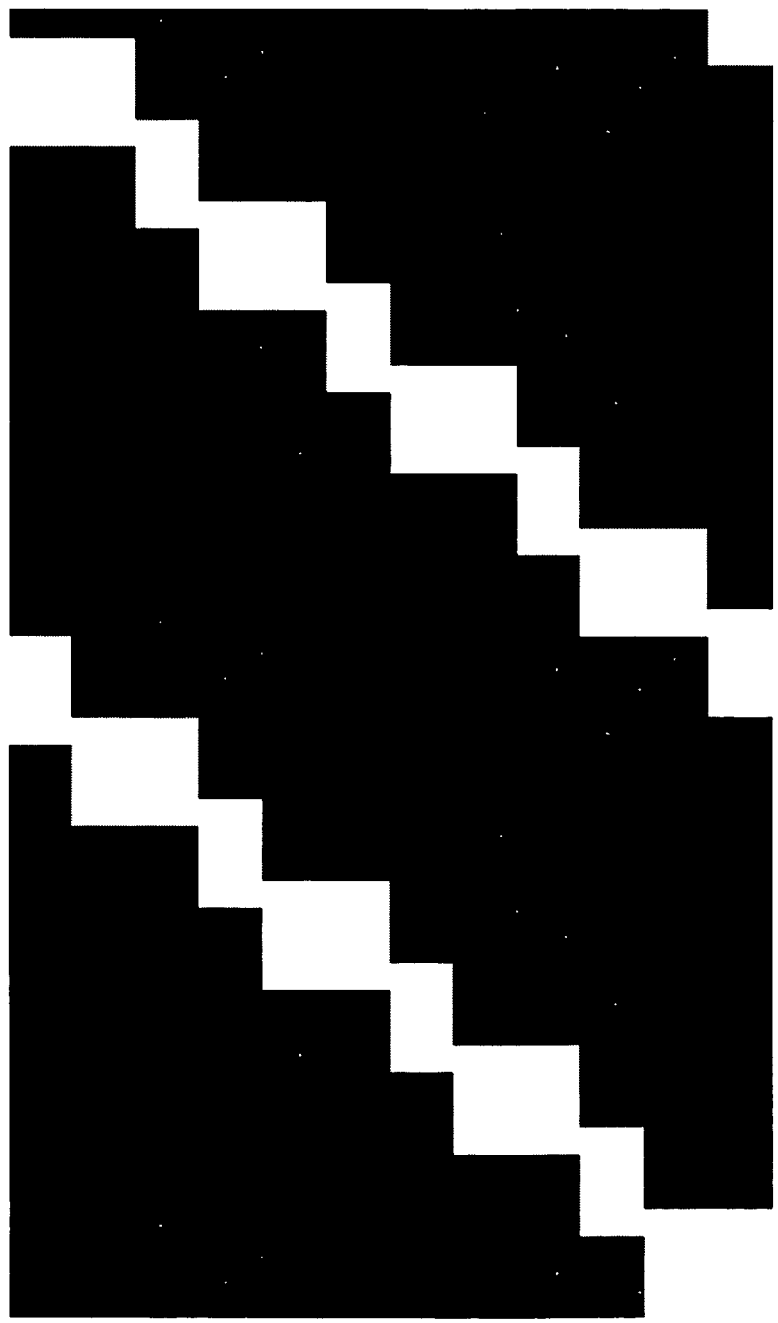
FIG. 17 shows a filter array in another embodiment of the invention, preferably to be applied with an image combination rule as illustrated in FIG. 9.
Figure 18:
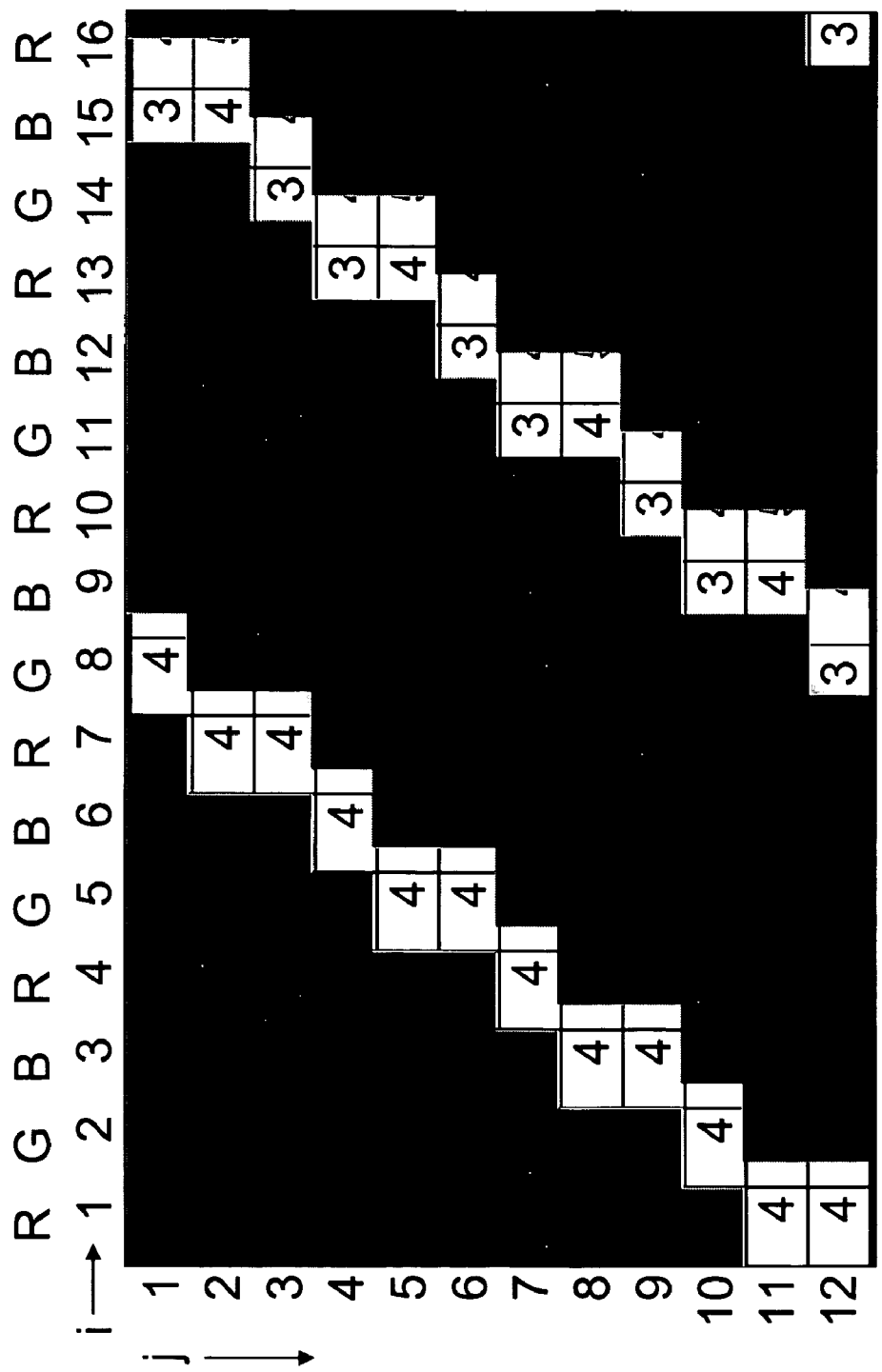
FIG. 18 shows an example of pixels or partial areas of pixels possibly visible to one eye of the observer, based on the conditions shown in FIG. 9 and FIG. 17.

FIG. 17 shows a filter array in another embodiment of the invention, preferably to be applied with an image combination rule according to FIG. 9, whereas FIG. 18 shows an example of pixels or partial areas of pixels possibly visible to one eye of the observer, based on the conditions shown in FIG. 9 and FIG. 17.

Figure 20:
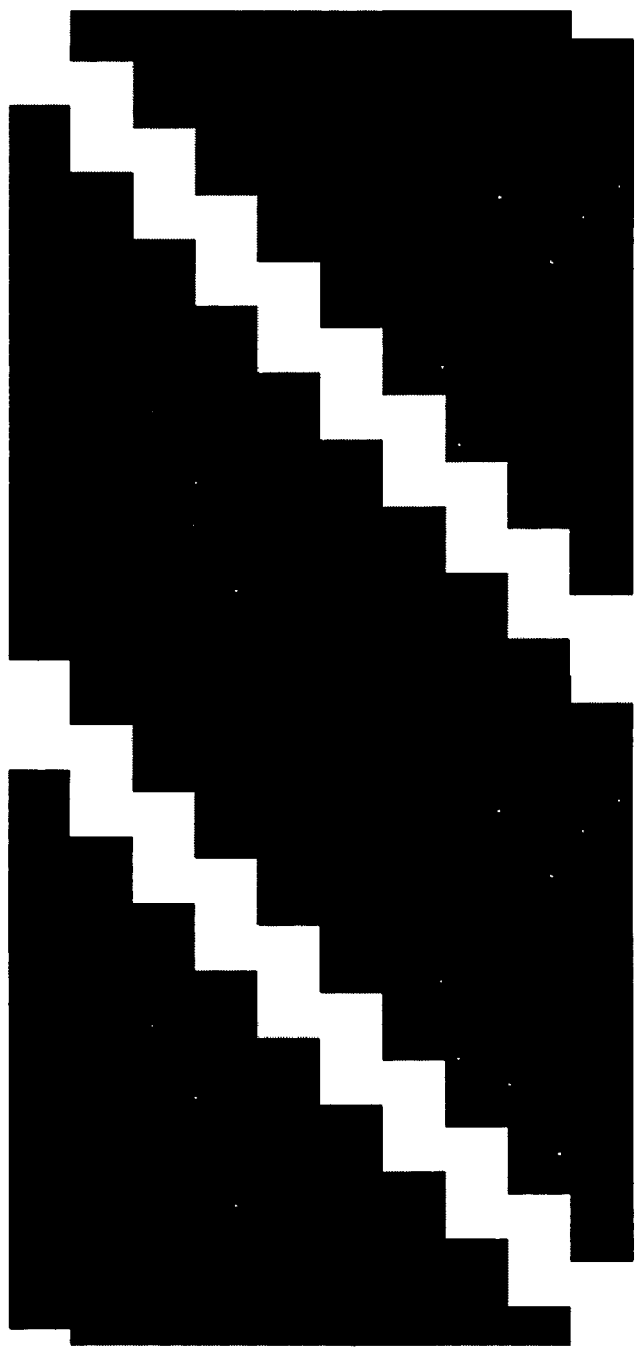
FIG. 20 shows a filter array that is excellently suitable for spatial display in conjunction with the image combination rule illustrated in FIG. 19, FIG. 21 and FIG. 22 show examples of pixels or partial areas of pixels possibly visible to an observer's two eyes, based on the conditions shown in FIG. 19 and FIG. 20.
Figure 21:
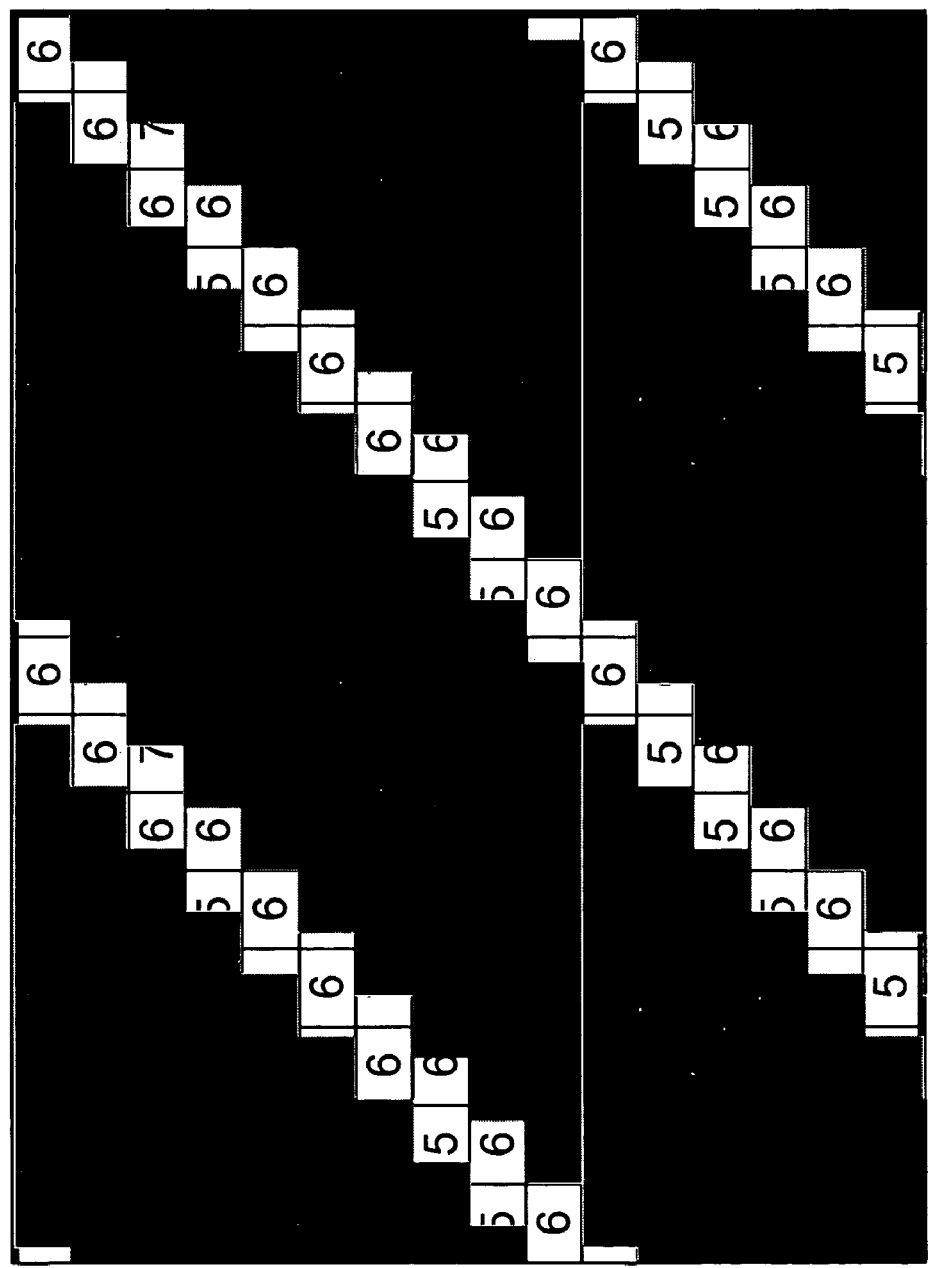
Figure 22:
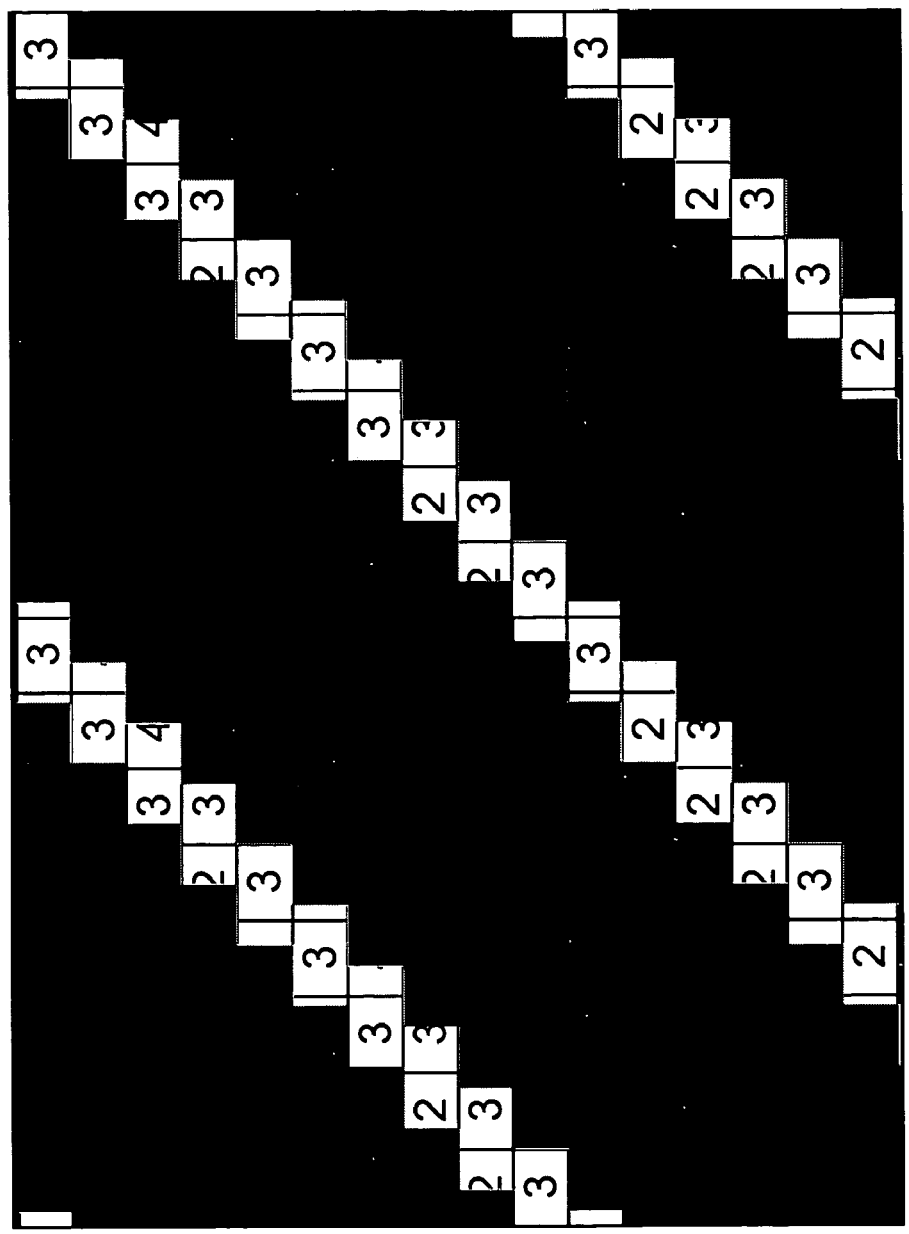

FIG. 19 shows yet another example of the image combination, and FIG. 20 illustrates a filter array according to the invention that is excellently suitable for three-dimensional displays in conjunction with the image combination rule according to FIG. 19. FIG. 21 and FIG. 22 show examples of pixels or partial areas of pixels possibly visible to an observer's two eyes, based on the conditions shown in FIG. 19 and FIG. 20. Here, eight views are presented, each of which is displayed in each row. As an alternative, one could present, e.g., 40 views instead, with preferably only eight different views (e.g., 1, 6, 11, 16, 21, 26, 31, 36) being displayed per row. Thus, the number of views n' displayed per row as described above would also be n'=8.

Yet another example of an embodiment of the invention is shown in FIGS. 23 through 26.

Figure 24:
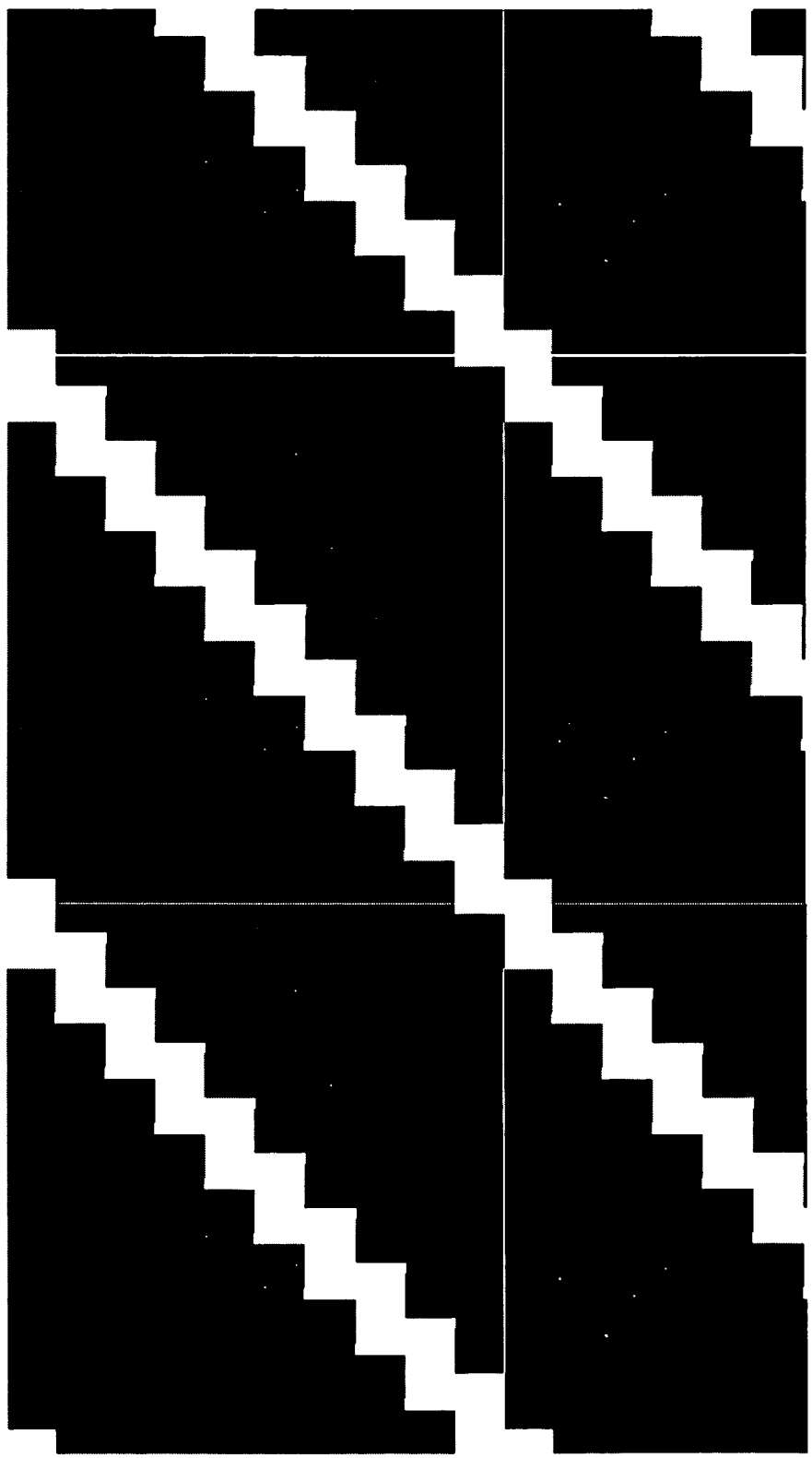
FIG. 24 shows a filter array that is excellently suitable for spatial display in conjunction with the image combination rule illustrated in FIG. 23, FIG. 25 and FIG. 26 show examples of pixels or partial areas of pixels possibly visible to an observer's two eyes, based on the conditions shown in FIG. 23 and FIG. 24.
Figure 25:
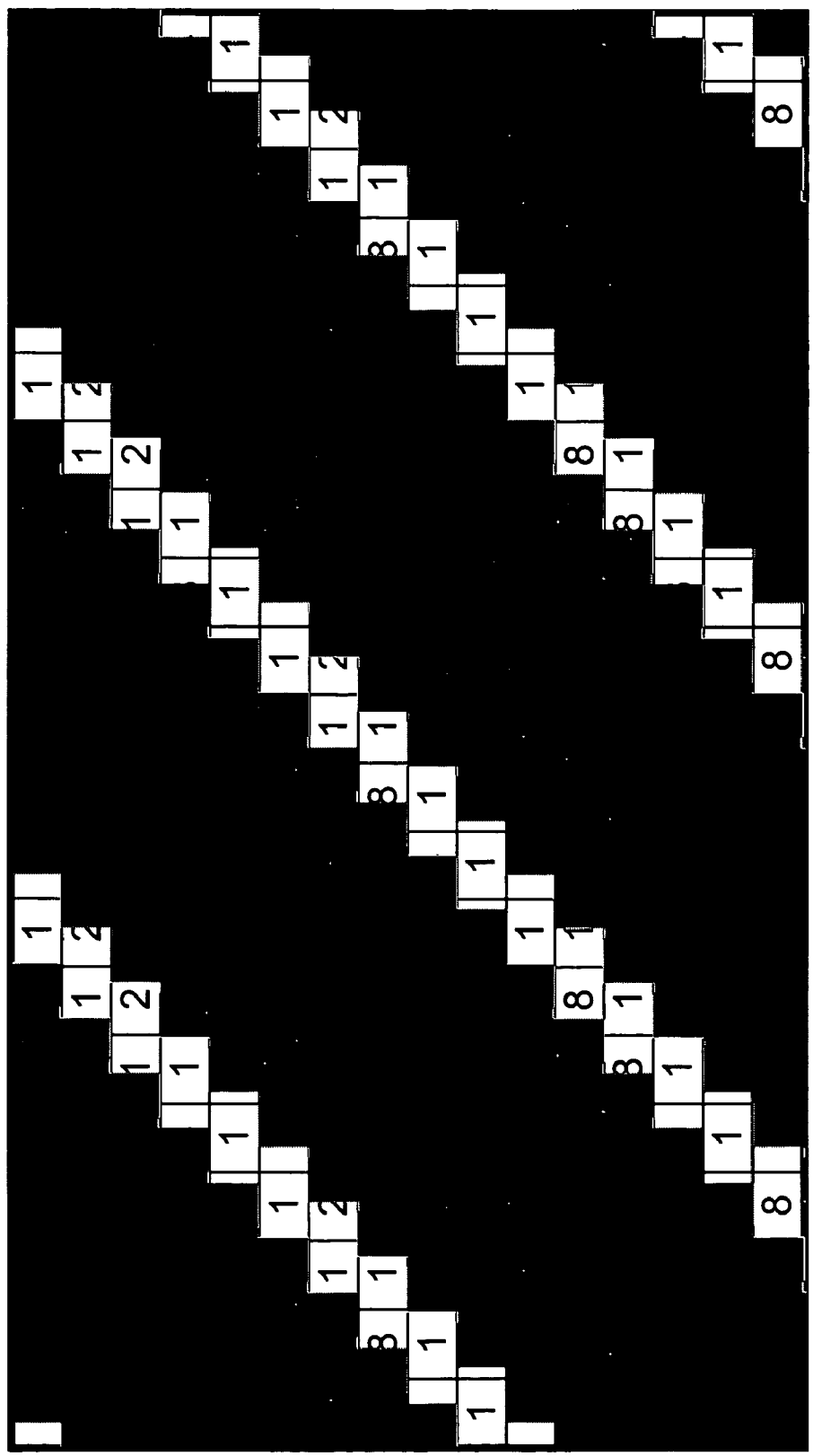
Figure 26:
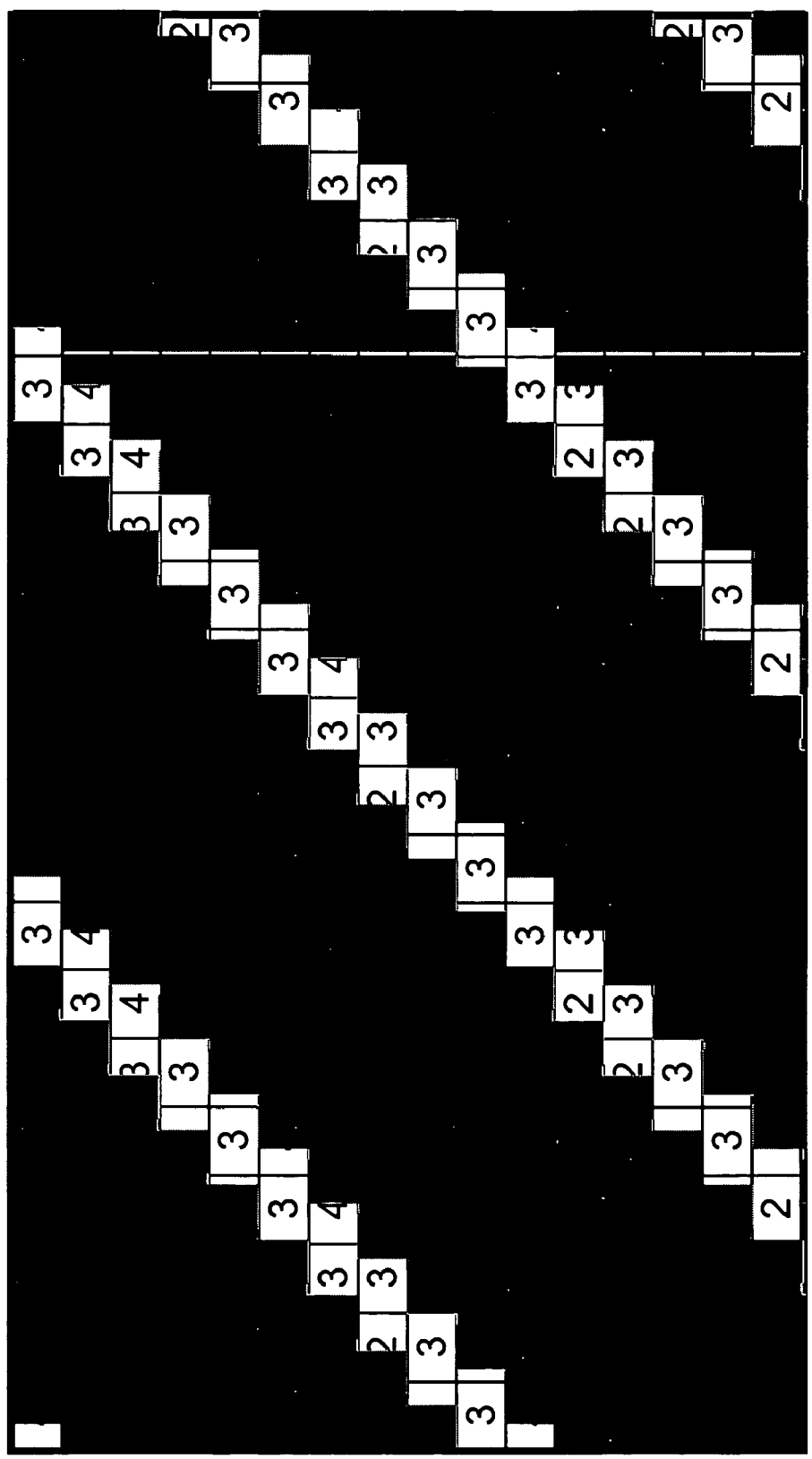

Of that example, FIG. 23 shows the image combination, FIG. 24 a filter array that is excellently suitable for three-dimensional displays in conjunction with the image combination rule according to FIG. 23, and FIGS. 25 and 26 illustrate examples of pixels or partial areas of pixels possibly visible to an observer's two eyes, based on the conditions shown in FIGS. 23 and 24. Here again, eight views are used for spatial presentation.

The further drawings illustrate in detail a third version of the arrangements according to the invention, in which at least one first continuous belt of transparent filters extending from one edge of the array to the opposite edge and at least one second continuous belt of transparent filters extending from one edge of the array to the opposite edge are provided, with the major extensions of these two belts on the array are not aligned in parallel with each other.

Figure 28:
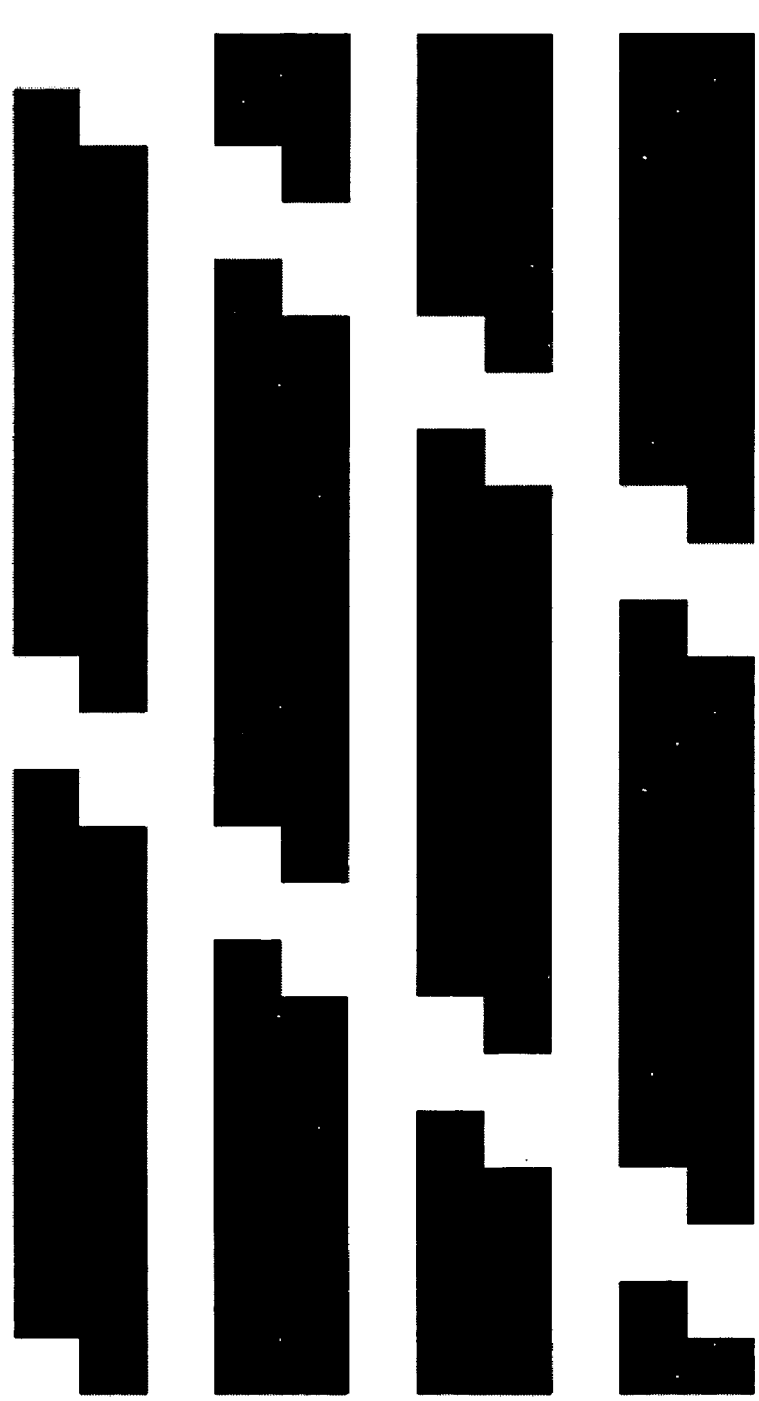
FIG. 28 shows a filter array that is excellently suitable for spatial display in conjunction with the image combination rule illustrated in FIG. 27, and that has horizontal belts of transparent filters according to the third embodiment of the arrangements according to the invention, FIG. 29
Figure 29:
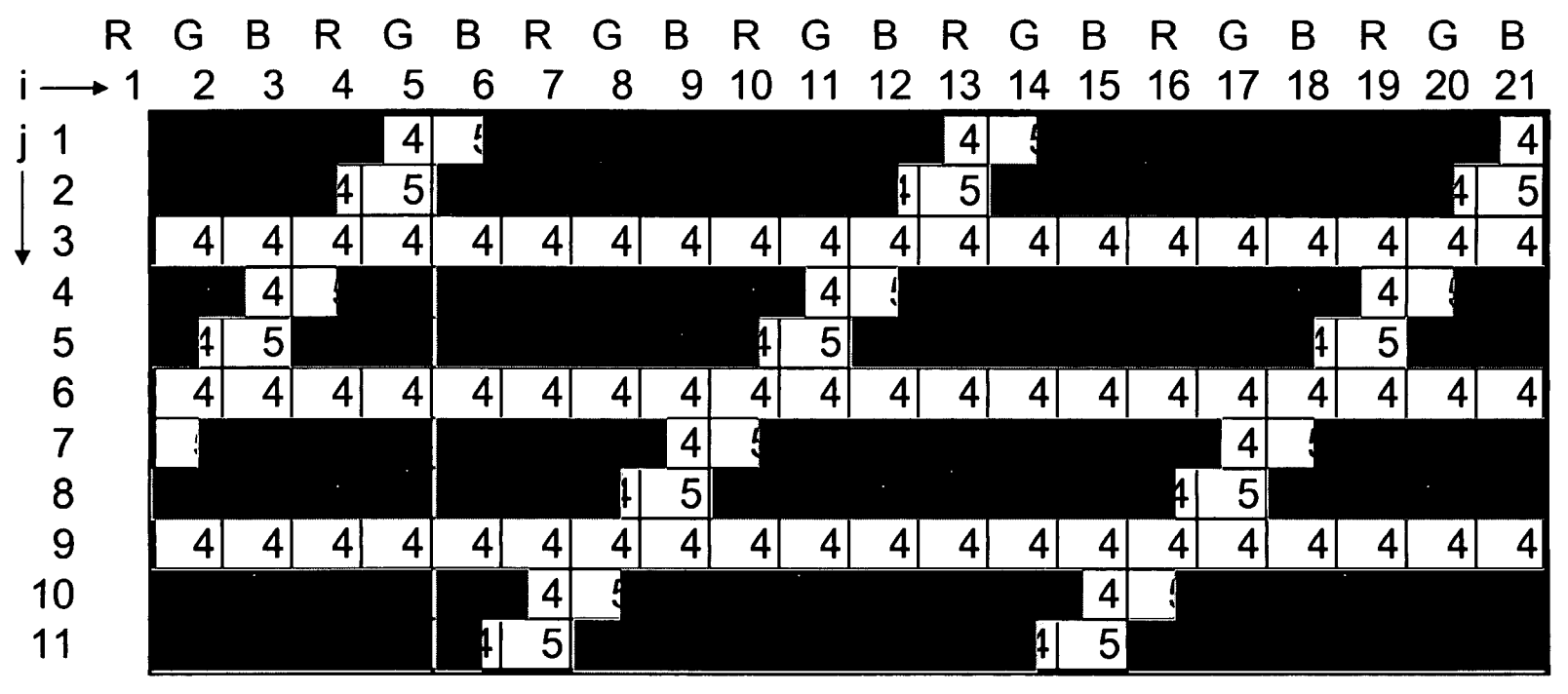
Figure 30:
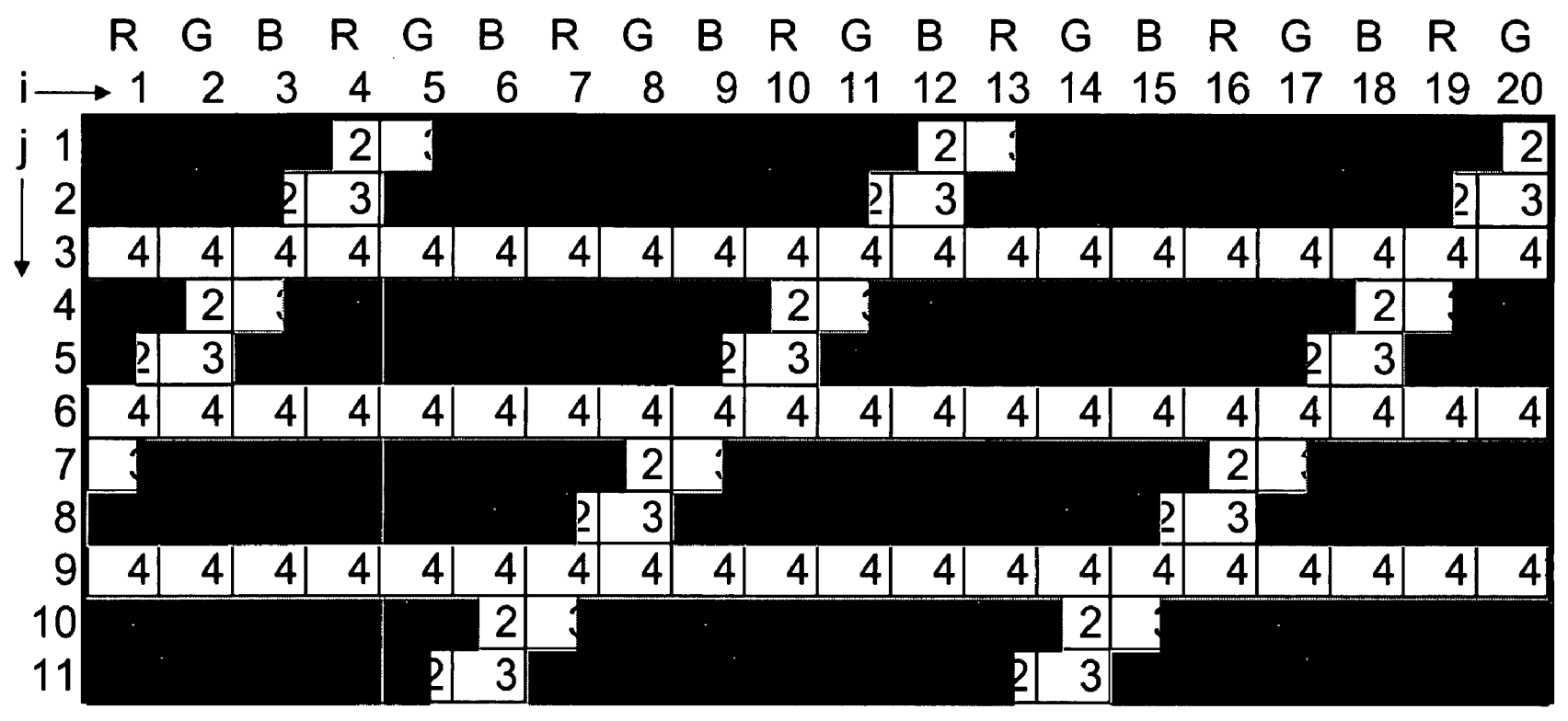

For this embodiment of the arrangement according to the invention, FIG. 27 shows another example of the image combination, and FIG. 28 a matching filter array with horizontal belts of transparent filters. FIG. 29 and FIG. 30 show examples of pixels or partial areas of pixels possibly visible to an observer's two eyes, based on the conditions shown in FIG. 27 and FIG. 28.

As can be seen from FIG. 28, examples of horizontal belts of transparent filters are provided. Also provided are stepped, oblique belts extending from the lower to the upper edge of the filter array, so that the main directions of light propagation of the horizontal and oblique belts are not parallel with each other. In practice, the filter array comprises many more filter elements; for the sake of clarity, the figure shows only a random segment of the filter array. Advantageously, a great number of such continuous belts of transparent filters are provided. As shown in FIG. 28, it is advantageous to space some or all of the continuous, horizontal belts of transparent filters at periodic distances on the array here, for example, every fourth row q (i.e. with m=4) of the array forms such a continuous horizontal belt of transparent filters.

As FIG. 29 shows for this example, in case of parallel projection of any, but not necessarily each, continuous horizontal belt of transparent filters onto the raster of pixels $\alpha_{ij}$ in viewing direction, predominantly such pixels $\alpha_{ij}$ are, at least partially, covered by transparent filters that in this case exclusively render bits of partial information of one and the same view $A_k$.

Another example of how the abovementioned embodiment of the arrangements according to the invention can be configured is given below. FIG. 31 shows the image combination for this example, FIG. 32 an excellently suitable filter array featuring vertical belts of transparent filters, among others, and FIG. 33 and FIG. 34 show examples of pixels or partial areas of pixels possibly visible to an observer's two eyes.

Figure 32:
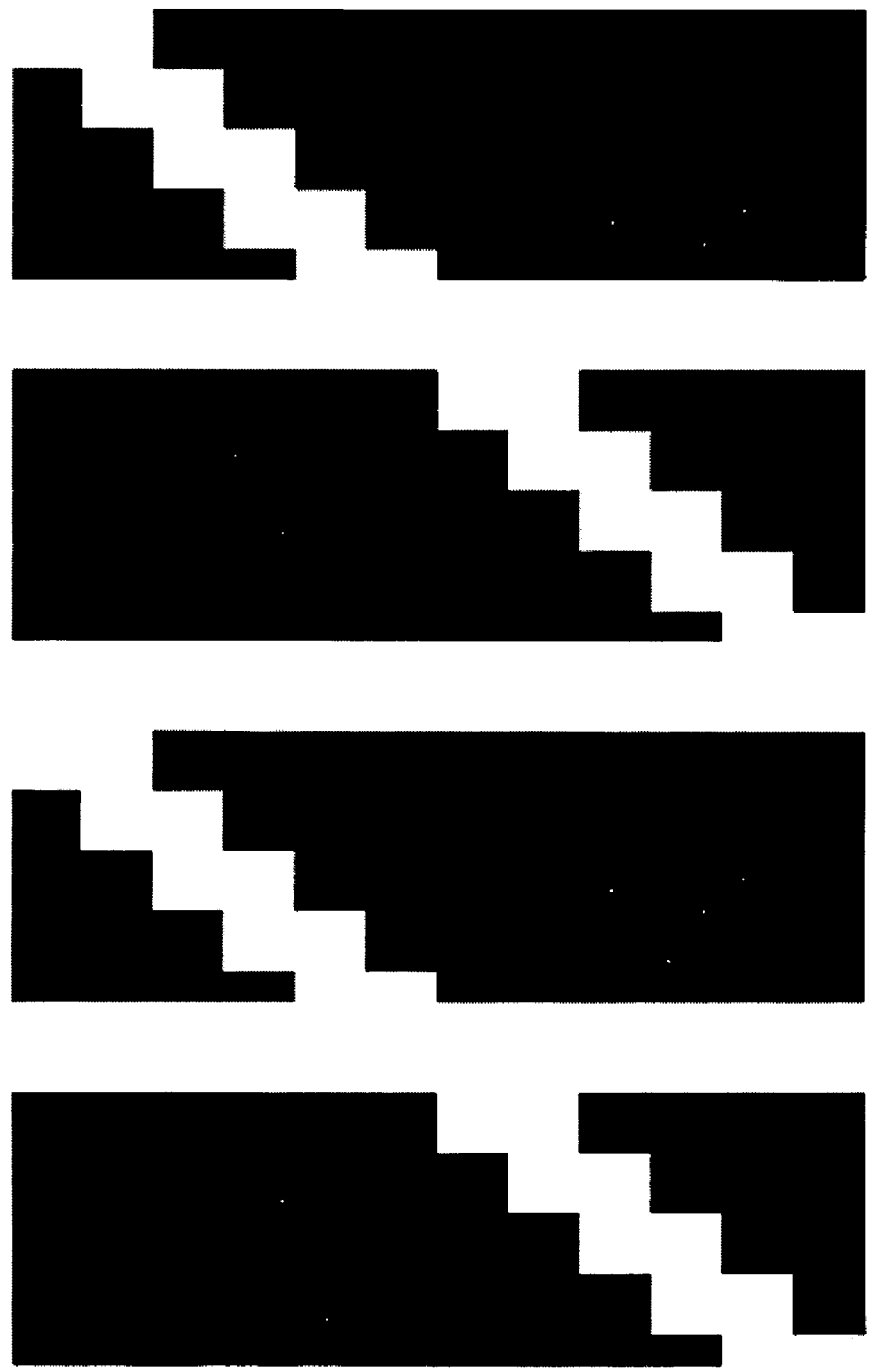
FIG. 32 shows a filter array that is excellently suitable for spatial display in conjunction with the image combination rule illustrated in FIG. 31, and that has vertical belts of transparent filters according to the third embodiment of the arrangements according to the invention, FIG. 33
Figure 33:
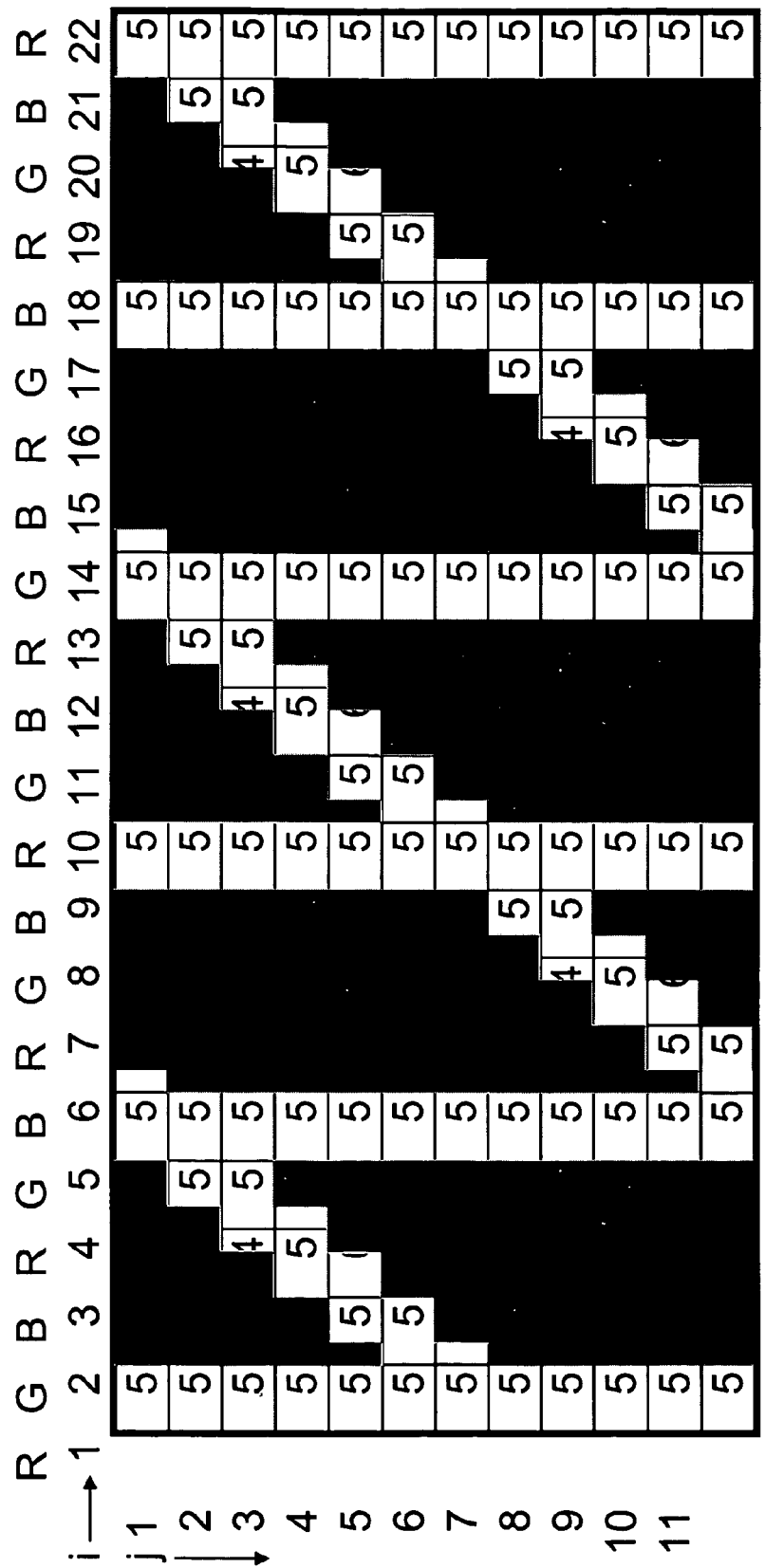

As can be seen in FIG. 32, the filter array is provided with both oblique and vertical continuous belts of transparent filters. As shown for this example in FIG. 33, in case of parallel projection of any, but not necessarily each, continuous vertical belt of transparent filters onto the raster of pixels $\alpha_{ij}$ in viewing direction, predominantly such pixels $\alpha_{ij}$ are, at least partially, covered by transparent filters that in this case predominantly render bits of partial information of one and the same view $A_k$ with k=5.

Figure 34:
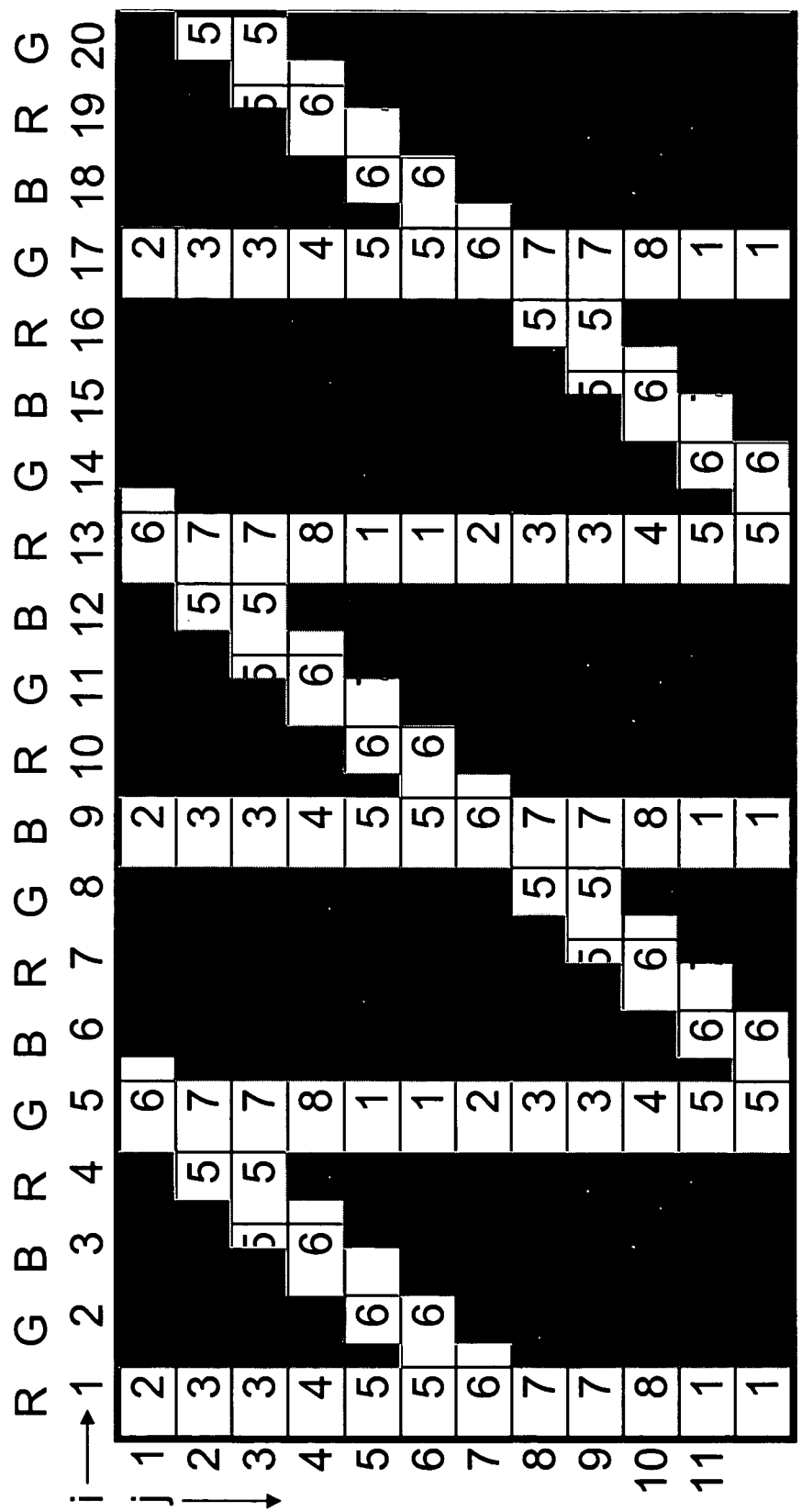
FIG. 34 shows examples of pixels or partial areas of pixels possibly visible to an observer's two eyes, based on the conditions shown in FIG. 31 and FIG. 32.

FIG. 34 would approximately correspond to a slightly displaced oblique view, i.e. not to the parallel projection in viewing direction (which, in strict terms, would lie in a direction parallel to the midperpendicular to the raster of pixels), but rather to a parallel projection in an oblique direction.

Contrary to the embodiments outlined before, it is also feasible to design the image combination rule in such a way that, in case of parallel projection of any, but not necessarily each, continuous belt of transparent filters onto the raster of pixels $\alpha_{ij}$ in viewing direction, several of such pixels $\alpha_{ij}$ are, at least partially, covered by transparent filters that render bits of partial information of at least two different views $A_k$. Various variations of the respective (at least two) views $A_k$ are feasible: For example, more than the required minimum of two views can be used, e.g., n or n−1 views. Also, the image combination structure for pixels covered at least partially by transparent filters in case of parallel projection as described above, may be a random structure—rather than a periodic one as described before, e.g., in FIG. 9—of bits of partial image information from several views. It is decisive for creating a 3D impression that the observer's two eyes see different selections of views, i.e. view mixes.

Moreover, in the above embodiments of the arrangements according to the invention, the width of the belts of transparent filters may vary. In case of the "oblique" belts described above, in particular, the width of the transparent filter segments per row may be selected to make the quotient of the total area of the transparent filters on the array and the total area of all filter elements on the array smaller than 1.1/n' or greater than 1.8/n'.

Figure 35:
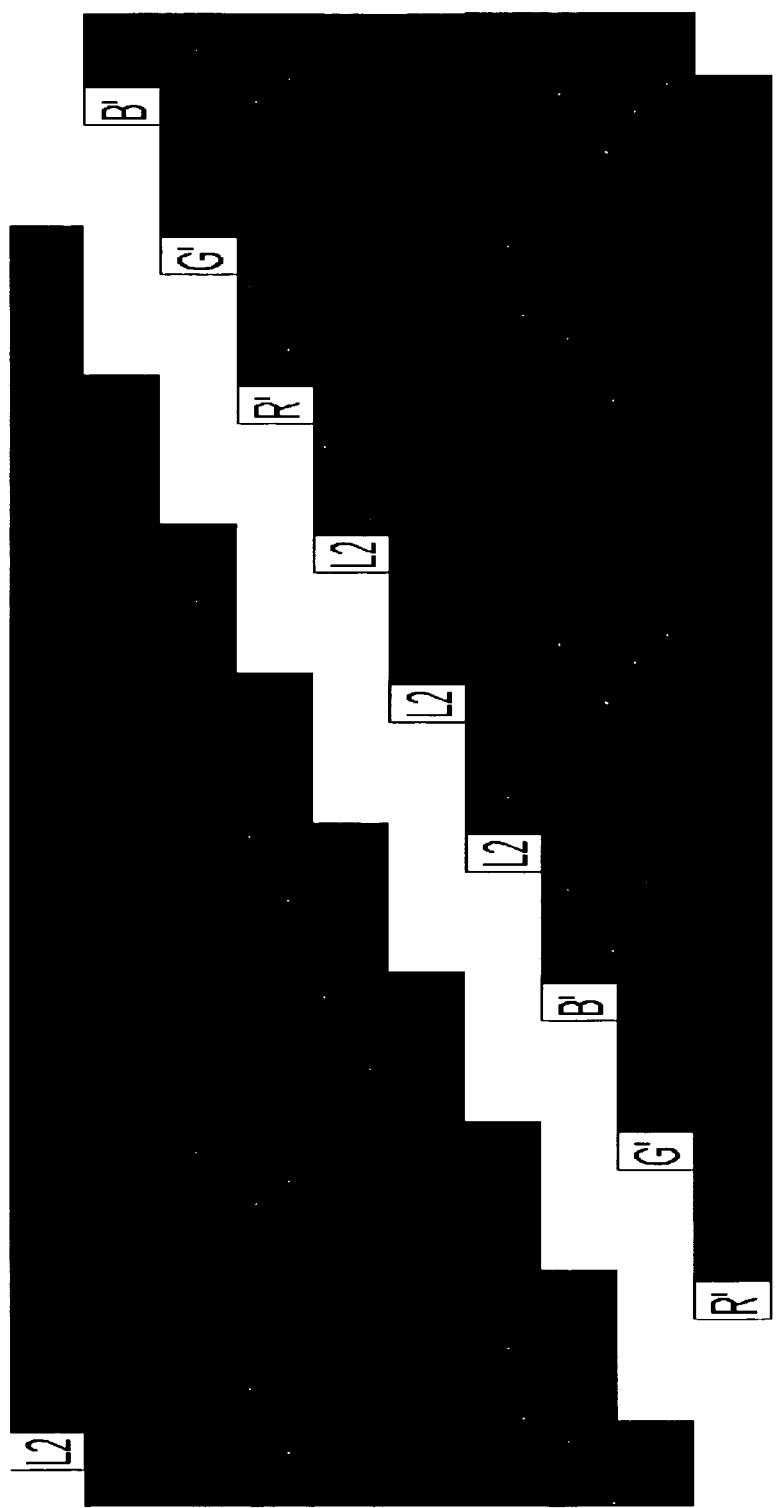
FIG. 35 shows yet another filter array that may satisfy the requirements of the first and second embodiments of the invention, comprising R', G', B' filters and gray level filters.

FIG. 35 shows another filter array that may satisfy the requirements of the embodiments of the invention described first above, and that is supplemented by R', G' and B' filters as well as gray level filters, with R' denoting red, G' green and B' blue wavelength filters. The respective filter elements cover the outlined parts of the area only. L2 denotes neutral, gray level filters that attenuate the light intensity by 50%, irrespective of the wavelength. These, as well as the R', G' or B' filters, are left out of consideration if, as regards the characteristic features according to the invention, such filter elements are referred to that are largely or essentially transmissive to light of essentially the entire visible spectral range. As the R', G' and B' filters are transmissive only to their respective red, green or blue wavelength ranges, and as the L2 filters attenuate the light intensity in no insubstantial degree, there is no speaking of "largely" or "essentially transmissive" here.

Figure 36:
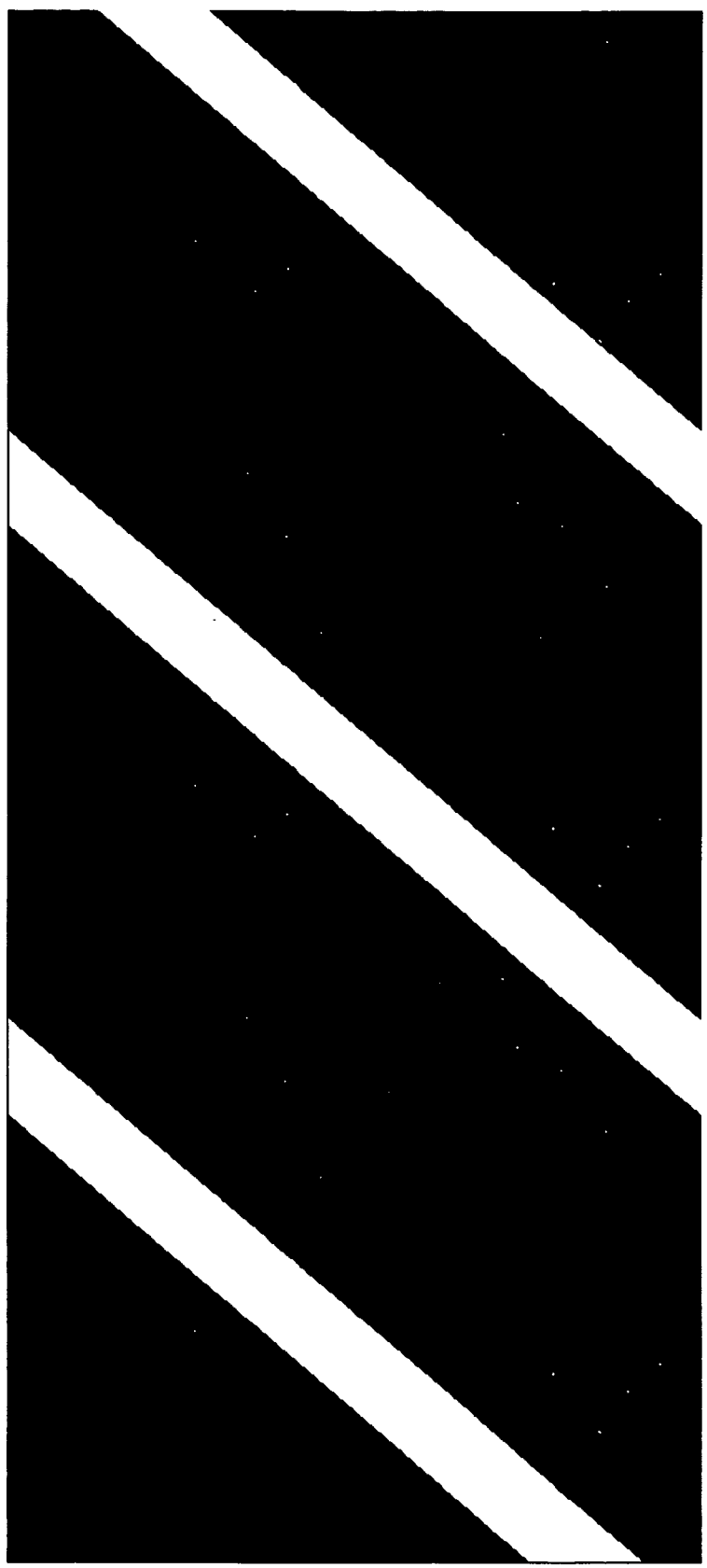
FIG. 36 shows yet another possible embodiment of a filter array, FIG. 37 schematically illustrates the composition of transparent filter segments from transparent filter elements as used in FIG. 36.

Another embodiment of a filter array according to the embodiments described first above is shown in FIG. 36.

Figure 37:
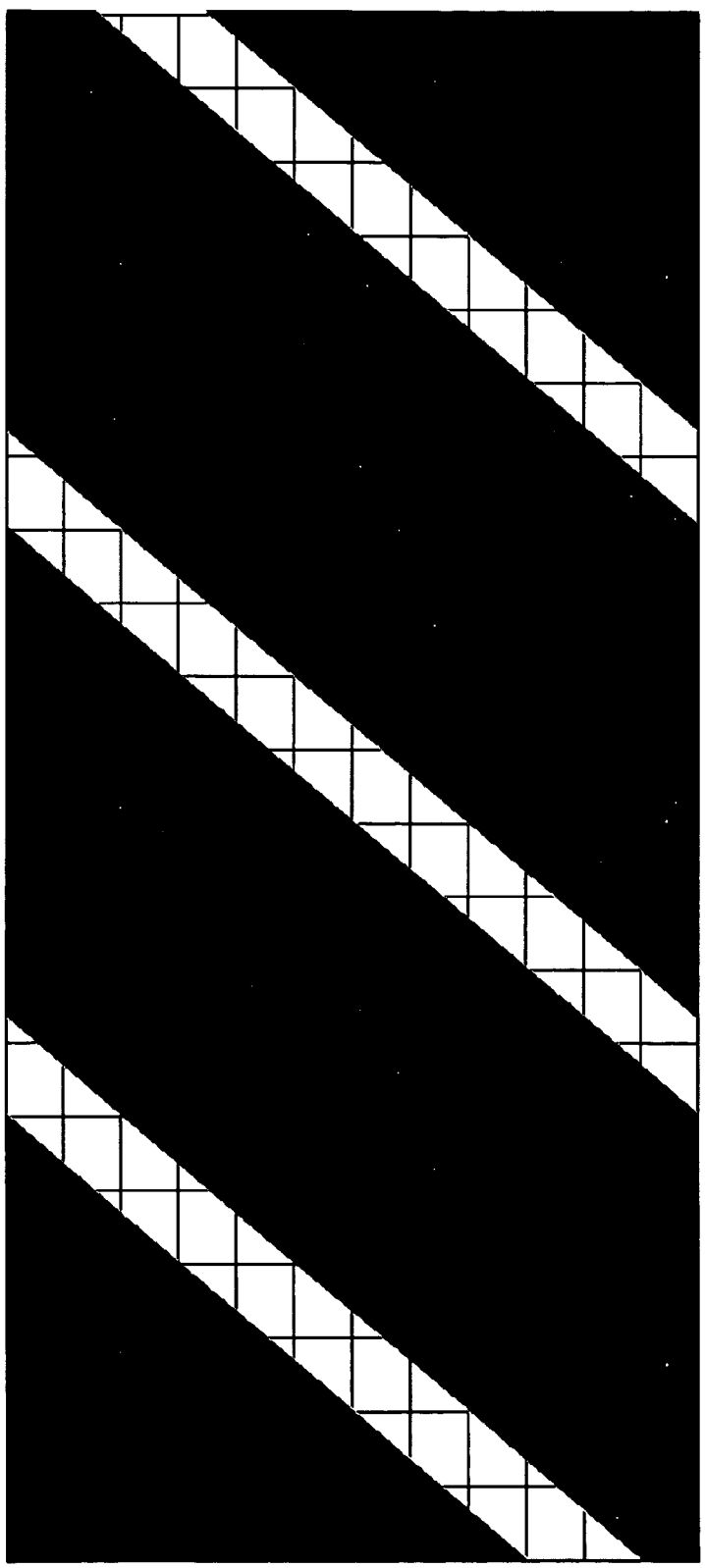
Figure 38:
FIG. 38 shows details of the filter elements used in FIG. 37, FIG. 39 and FIG. 40 show examples of pixels or partial areas of pixels possibly visible to one and the other of the observer's two eyes, respectively, based on the conditions shown in FIG. 36.
Figure 39:
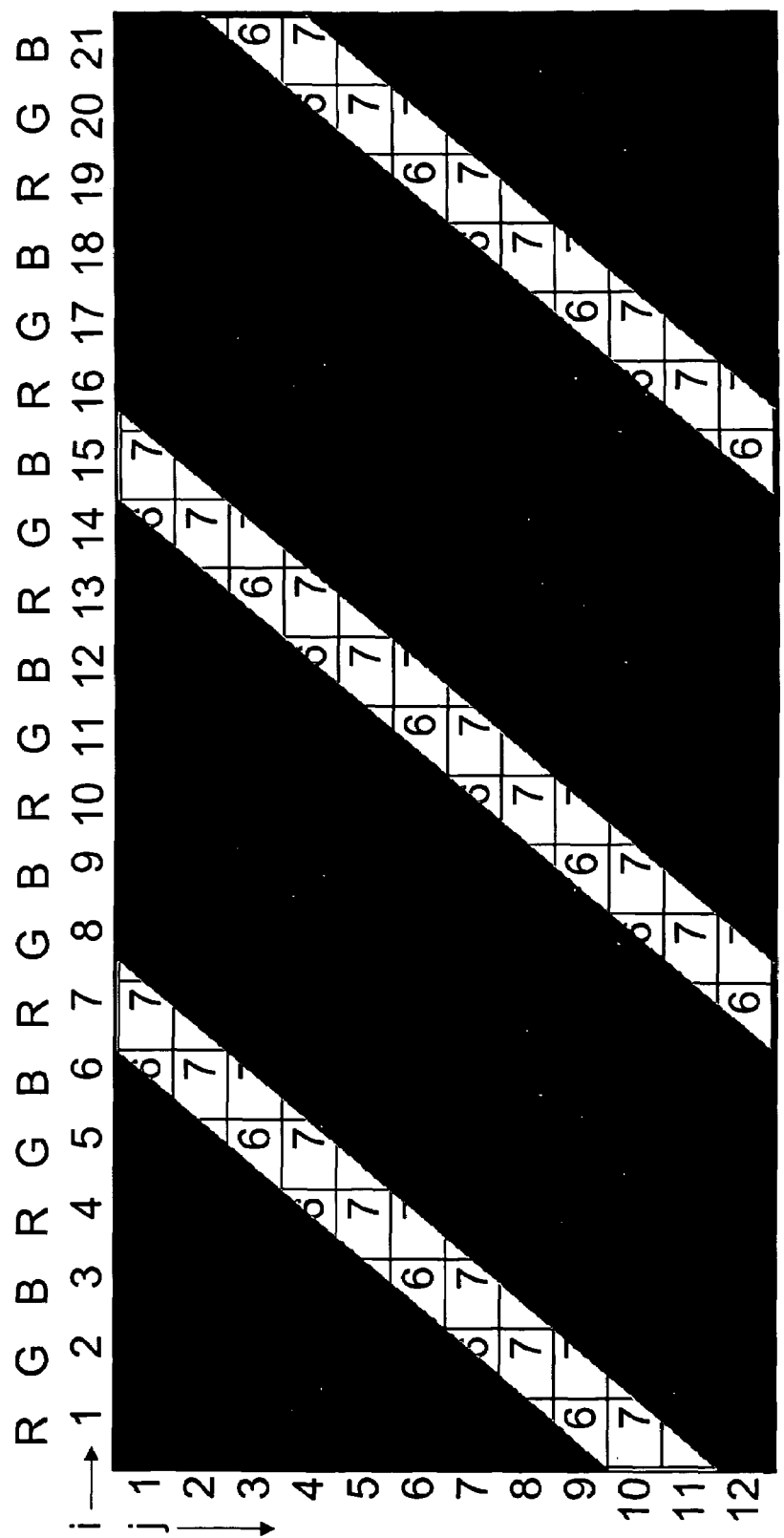
Figure 40:
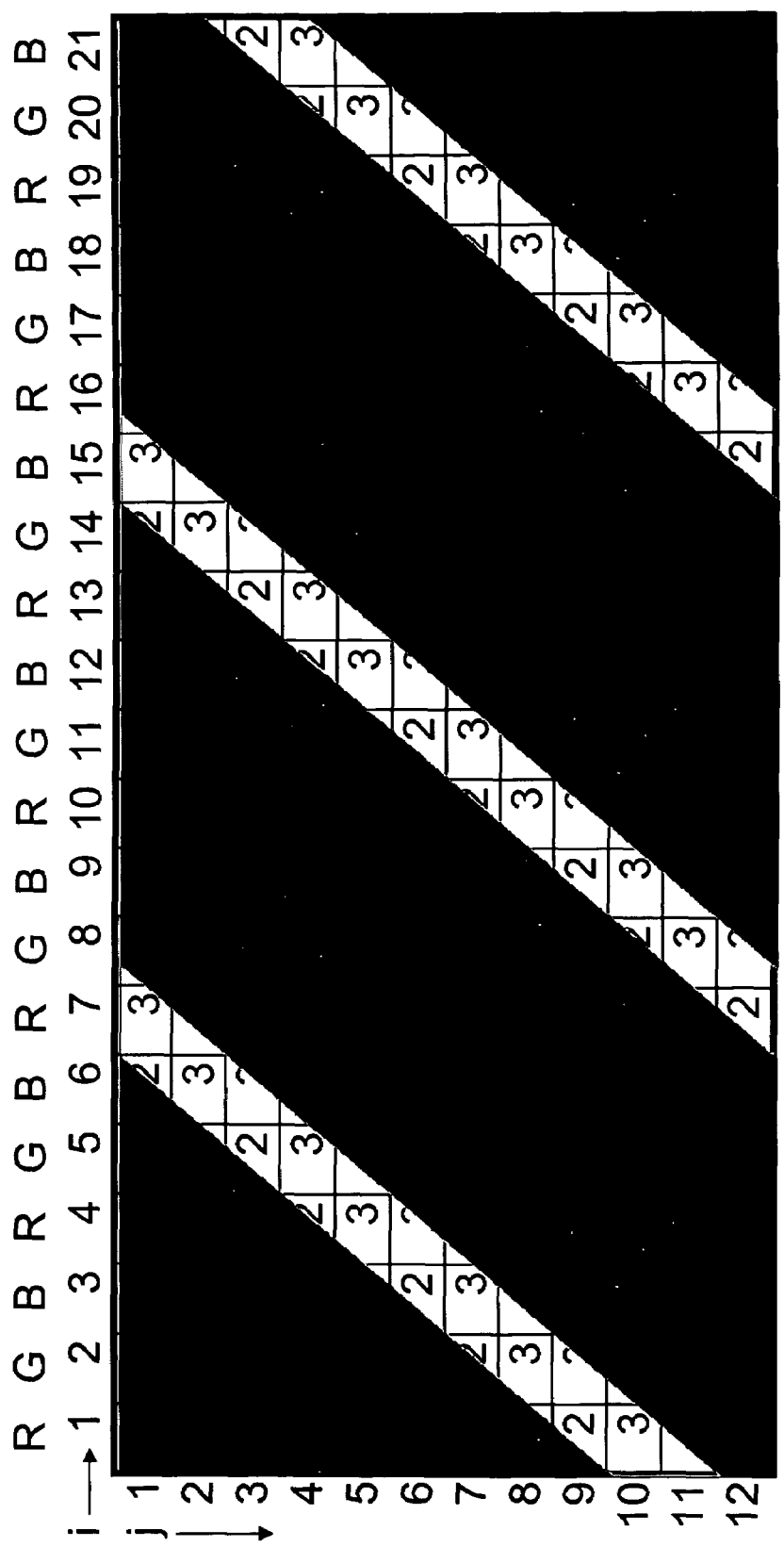

Unlike in the examples described above, in which the surfaces of the filter elements $\beta_{pq}$ facing the front, i.e. the observer, have the form of regular rectangles, in this case filter elements $\beta_{pq}$ of many different shapes are used, so that the oblique stripes covered, e.g., with transparent filters, get essentially smooth edges. This can be made clear by means of FIGS. 37 and 38. FIG. 37 shows, as a grid structure, the array on which the filter elements $\beta_{pq}$ are arranged. The individual filter elements used are shown side by side in FIG. 38. The correlation to, or combination into, a mask image can be determined analogously with the equation for b described above; however, every value of b now relates to one of the shapes shown in FIG. 38. FIG. 39 and FIG. 40 show examples respectively for the left and the right eye 3 of the observer, i.e. the figures show which pixels with which views are seen by the two eyes from a given observer position. Moreover, it is also possible to arrange the stripes vertically instead of obliquely. In this example, too, as well as in the following one, the quotient of the sum of areas covered by filter elements $\beta_{pq}$ largely transmissive to light of essentially the entire visible spectral range and the sum of the areas covered by all filter elements $\beta_{pq}$ is between 1.1 and 1.8.

Figure 42:
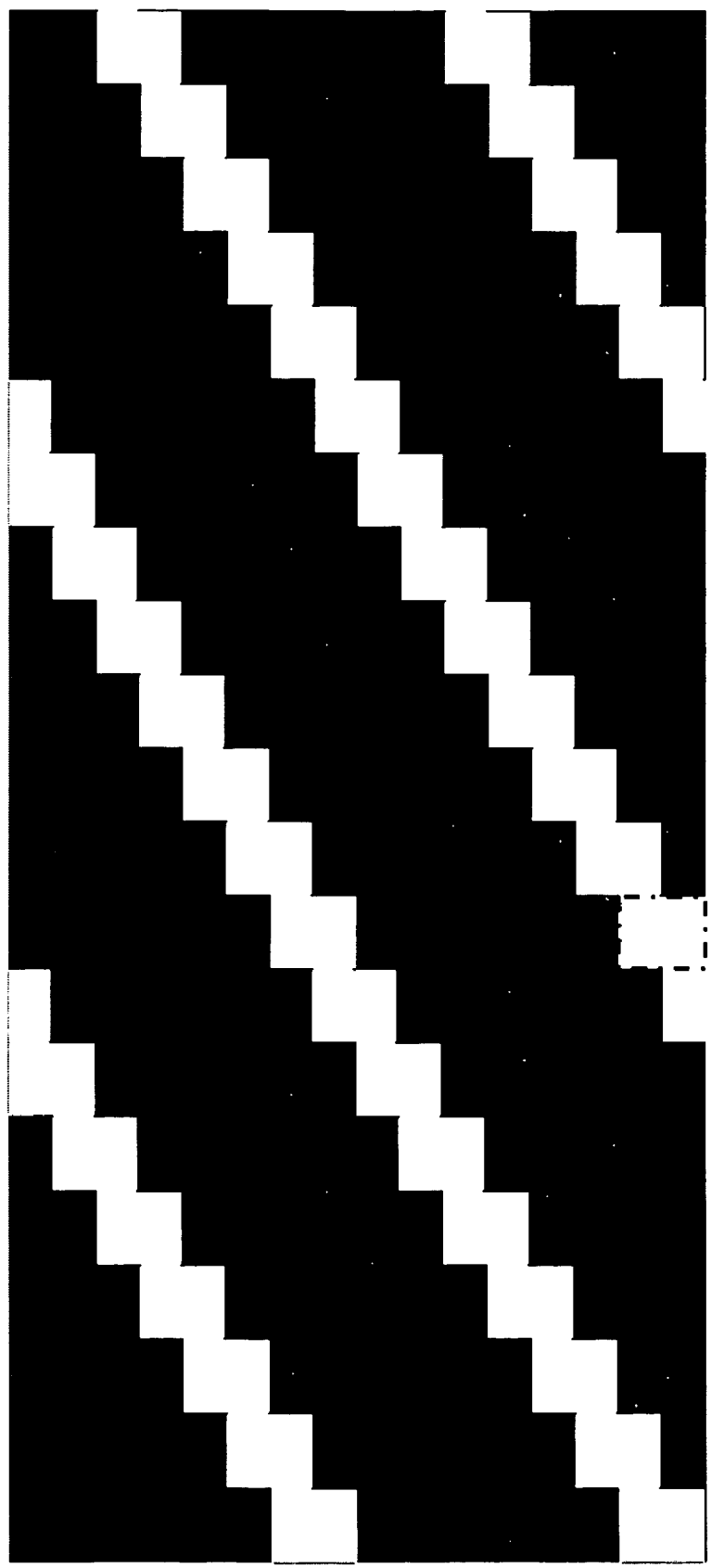
FIG. 42 shows a filter array fur use with the image combination shown in FIG. 41, and FIG. 43 and FIG. 44 show examples of pixels or partial areas of pixels possibly visible to one and the other of the observer's two eyes, respectively, based on the conditions shown in FIG. 41.
Figure 43:
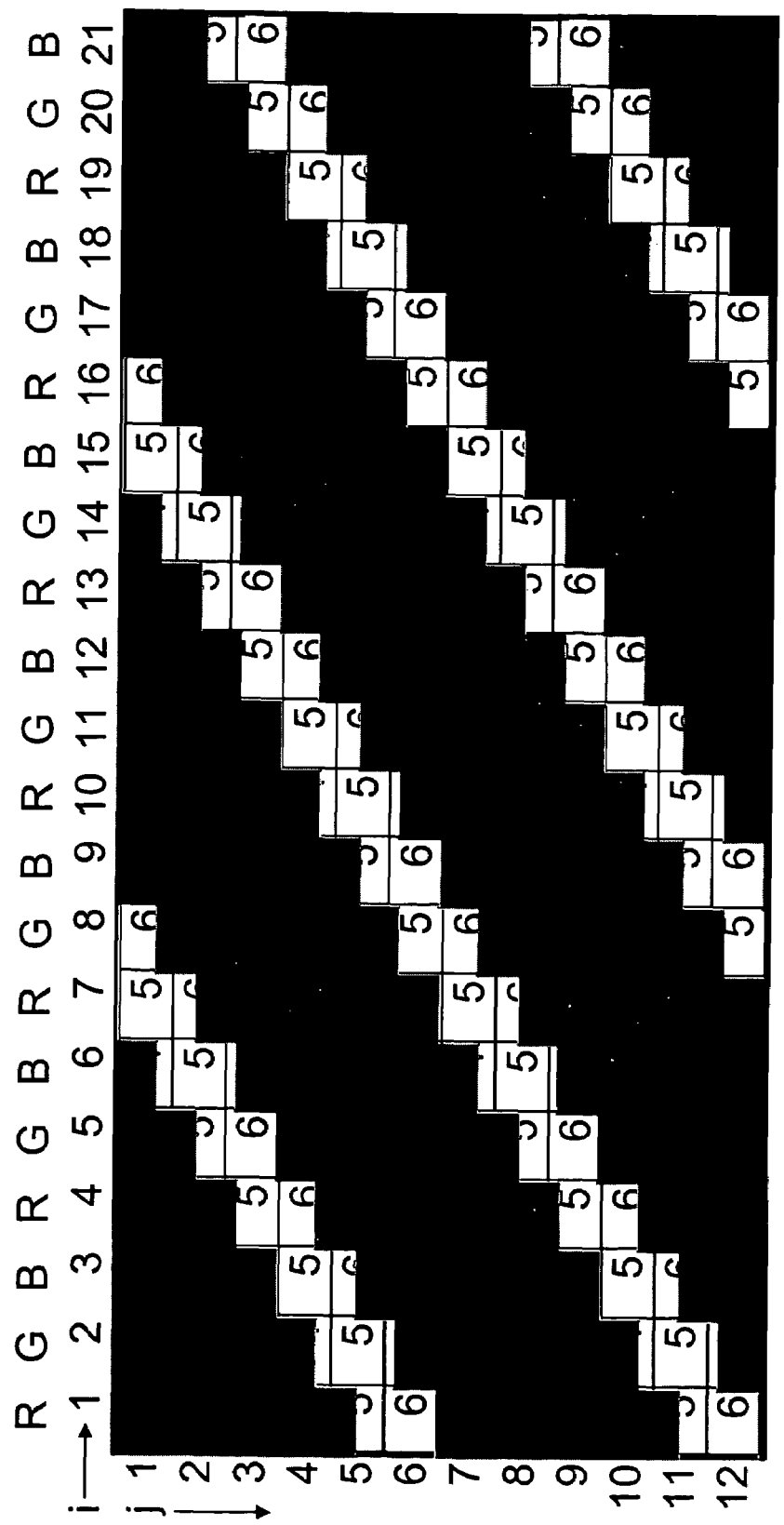
Figure 44:
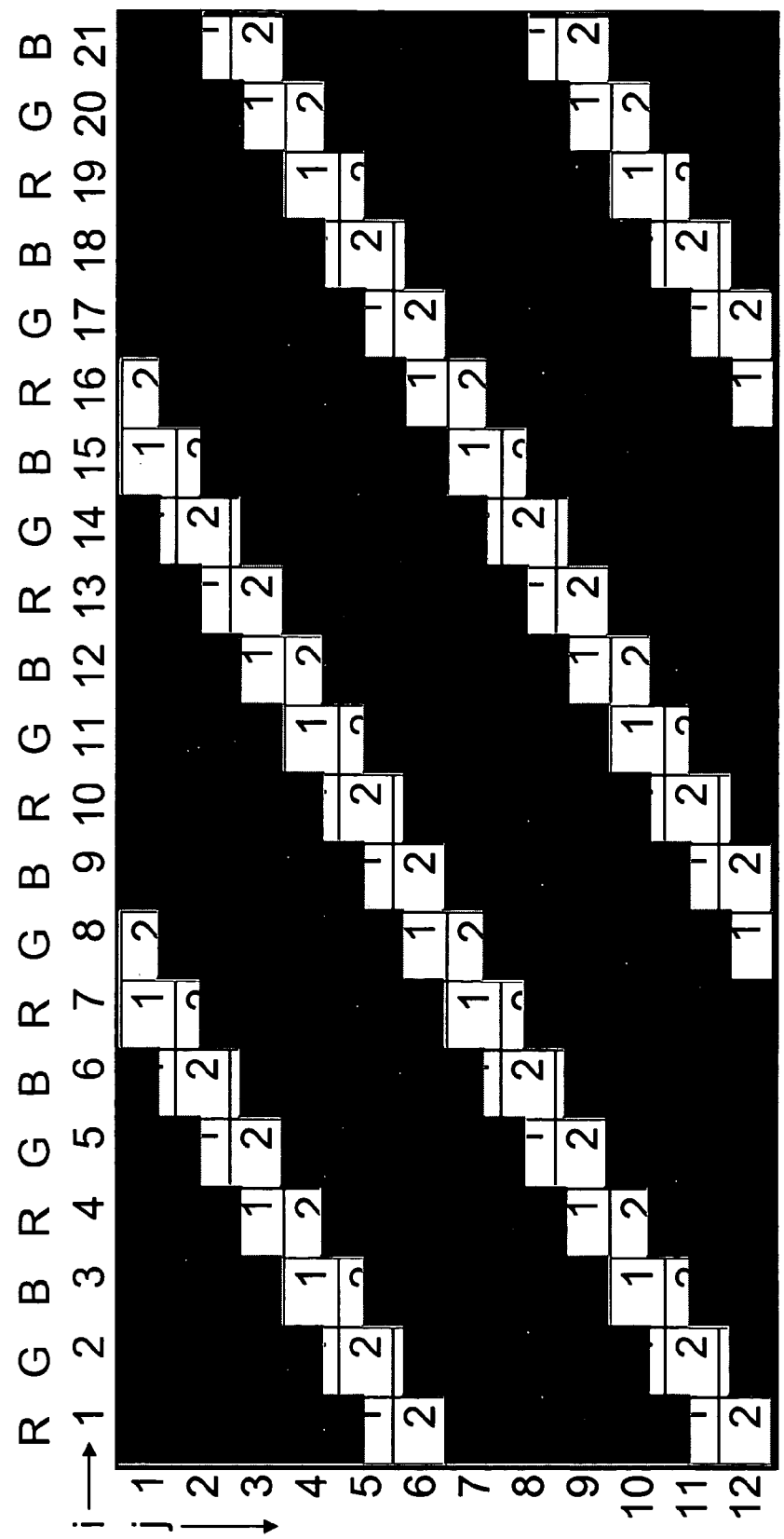

A last example of an embodiment following those described first above is illustrated by FIGS. 41 through 44. FIG. 41 shows an image combination of six views (n'=6); combinations of more or fewer views are also possible, though. FIG. 42 shows a filter array that is excellently suitable for three-dimensional displays in conjunction with the image combination rule according to FIG. 41. FIG. 43 and FIG. 44 show, by way of example, which pixels with which views are seen by the two eyes of an observer from a given position.

In FIG. 42, the dimensions of a transparent filter are indicated by broken lines. The width of the transparent filter approximately equals that of a pixel $\alpha_{ij}$; for example, it may be exactly 99.86% of the pixel width. The height of the transparent filter is about 1.5 times or, for example, exactly 149.8% of the height of a pixel $\alpha_{ij}$. These conditions prevail, e.g., with some 18.1-inch LC displays, where the mean width of the pixels is 0.28047 mm and the mean height is 0.09349 mm. A transparent filter element, then, is about 0.420146 mm high and 0.093366 mm wide.

If the individual transparent filters of the filter array have only half the height compared to that shown in FIG. 42, it is possible to implement the structure via the determination of the mask image according to the above equation.

Compared to prior art, the invention has the advantage that it permits the image brightness in 3D display to be increased. In conjunction with this, it ensures improved text readability on the arrangements according to the invention.

What is claimed is:

1. An arrangement for the spatial display of a scene or object, comprising an imaging device with a great number of pixels in a raster of rows and columns, in which the pixels render bits of partial information from at least three views of the scene or object, and an array of filter elements arranged in rows and columns, part of which are transparent to light of specified wavelength ranges, and the remaining part are opaque to light, the array being arranged in front of or behind the imaging device with the pixels, so that propagation directions are given for the light emitted by the pixels, and in which each pixel corresponds with several filter elements assigned to it, or each filter element corresponds with several pixels assigned to it, in such a way that each straight line connecting the area center of a visible segment of the pixel and the area center of a visible segment of the filter element corresponds to a propagation direction, and in which, within a viewing space in which observers located, the propagation directions intersect at a great number of intersection points, each of which represents an observer's position, so that the observer at any of these positions will predominantly see bits of partial information from a first selection of views with a first eye, and predominantly bits of partial information from a second selection of views with a second eye, wherein in at least a segment of the array, the ratio between the areas covered by filter elements transparent to light of specified wavelength ranges and the total area of all filter elements, multiplied by the average number of the different views displayed per row of the raster of pixels, is greater than one.

2. An arrangement as claimed in claim 1, wherein the filter elements transmissive to light of specified wavelength ranges are transparent filters transmissive to substantially the entire visible spectrum.

3. An arrangement as claimed in claim 1, wherein the filter elements transmissive to light of specified wavelength ranges are dimensioned that more than one pixel is visible per visible raster segment with reference to the pixel area.

4. An arrangement as claimed in claim 1, characterized in that the quotient of the sum of areas covered by filter elements largely transmissive to light of substantially the entire visible spectrum and the sum of the areas covered by all filter elements of the respective array has a value lying between the quotient Q1=1.1/n' and the quotient Q2=1.8/n', so that, because of the filter elements transmitting light of the complete visible spectrum, always about 1.1 to 1.8 pixels on average are visible per visible raster segment with reference to the pixel area.

5. An arrangement as claimed in claim 1, wherein, in case of parallel projection onto the raster of pixels, the segment corresponds to at least one row or at least one column.

6. An arrangement as claimed in claim 1, characterized in that, in case of parallel projection of a sufficiently large filter segment of at least one of the arrays of filter elements provided onto at least one row or onto at least one column of the raster, not less than 1.1/n' times but not more than 1.8/n' times the area of the respective row or column is covered by filter elements transmissive to light of substantially the entire visible spectrum, so that, because of the filter elements transmitting light of the entire visible spectrum, about 1.1 to 1.8 pixels on average are visible per visible raster segment with reference to the pixel area.

7. An arrangement as claimed in claim 1, further comprising at least one first continuous belt of transparent filters extending from one edge of the array to the opposite edge, and at least one second continuous belt of transparent filters extending from one edge of the array to the opposite edge, with main directions of light propagation from at least first and second continuous belts not being parallel with each other.

8. An arrangement as claimed in claim 7, wherein at least one of the continuous belts of transparent filters provided is aligned in parallel with the upper, lower, left or right edge of the respective array of filter elements and/or parallel with the upper, lower, left or right edge of the raster of pixels.

9. An arrangement as claimed in claim 7, comprising a plurality of continuous belts of transparent filters.

10. An arrangement as claimed in claim 7, characterized in that at least some of the continuous belts of transparent filters are randomly distributed over array, while maintaining the belts arranged in parallel with each other.

11. An arrangement as claimed in claim 7, wherein at least some of the continuous belts of transparent filters are spaced at periodic distances on the array, while maintaining the belts arranged in parallel with each other, and wherein one of the continuous belts of transparent filters forms every m-th row of the respective array.

12. An arrangement as claimed in any of the claim 7, wherein, in case of parallel projection of any, but not necessarily each continuous belt of transparent filters onto the raster of pixels in viewing direction, predominantly such pixels are covered, at least in part, by such transparent filters that predominantly or exclusively render bits of partial information from one and the same view.

13. An arrangement as claimed in claim 7 wherein, in case of parallel projection of at least one of the continuous belt of transparent filters onto the raster of pixels, several pixels are covered, at least in part, by transparent filters that render bits of partial information of at least two different views.

14. An arrangement as claimed in claim 1, an assignment of bits of partial information from the views $(A_k)(k=1 \ldots n)$ to pixels $(alpha_{ij})$ of the position $(i, j)$ is made according to the equation $$k=(i-c_{ij})*(j-n)*IntegerPart[((i-c_{ij})*(j-1)/n],$$

in which
(i) is the index of a pixel $(alpha_{ij})$ in a row of the raster,
(j) is the index of a pixel $(alpha_{ij})$ in a column of the raster,
(k) is the consecutive number of the view $(A_k)(k=1 \ldots n)$ from which the partial information to be rendered on a particular pixel $(alpha_{ij})$ originates,
(n) is the total number of the views $(A_k)(k=1 \ldots n)$ used at a time,
$(c_{ij})$ is a selectable coefficient matrix for the combination or mixture on the raster of the various bits of partial information originating from the views $(A_k)(k=1 \ldots n)$, and
IntegerPart is a function for generating the largest integer that does not exceed the argument put in brackets.

15. An arrangement as claimed in claim 1, wherein, for the filter arrays provided, the filter elements $(beta_{pq})$ are combined into a mask image depending on their transmission wavelength, their transmission wavelength range or their transmittance according to the equation $$b=(p-d_{pq})*(q-n_m)*IntegerPart[((p-d_{pq})*(q-1))/n_m],$$

in which
(p) is the index of a filter element $(beta_{pq})$ in a row of the respective array,
(q) is the index of a filter element $(beta_{pq})$ in a column of the respective array,
(b) is an integer that defines one of the intended transmission wavelengths, transmission wavelength ranges or transmittances $(lambda_b)$ for a wavelength or gray level filter $(beta_{pq})$ in the position $(p, q)$, and that may adopt values between 1 and $(b_{max})$, with $b_{max}$ being a natural number greater than 1,
$(n_m)$ is an integral value greater than zero that preferably equals the total number (k) of the views $(A_k)$ displayed in the combination image,
$(d_{pq})$ is a selectable mask coefficient matrix for varying the generation of a mask image, and
IntegerPart is a function for generating the largest integer that does not exceed the argument put in brackets.

16. An arrangement as claimed in claim 1, wherein exactly one array of filter elements $(beta_{pq})$ is provided and the distance (z) between the array and the raster of pixels $(alpha_{ij})$, measured in a direction normal to the raster, is defined according to the equation $$p_d/s_p = (d_a \pm z)/z,$$

in which
- ($S_p$) is the mean horizontal distance between two neighboring pixels (alpha$_{ij}$),
- ($P_d$) is the mean interpupillary distance of an observer, and
- $d_a$ is a selectable viewing distance.

17. An arrangement as claimed in claim 1, wherein all filter elements provided on the filter array or filter arrays are of equal size.

18. An arrangement as claimed in claim 1, wherein the filter elements provided on the filter array or filter arrays have an essentially periodic arrangement.

19. An arrangement as claimed in claim 1, wherein the light propagation directions for the partial information rendered on the pixels are specified depending on their wavelength range.

20. An arrangement as claimed in claim 1, wherein on at least one of the arrays of filter elements provided, in at least one row (q) of the array, immediately neighboring transparent filters border on a different number of immediately neighboring transparent filters on row (q−1) than on row (q+1).

21. An arrangement as claimed in claim 1, wherein each of the filter arrays provided comprises a static, temporally invariable filter array and arranged in a substantially fixed position relative to the raster of pixels.

22. An arrangement as claimed in claim 1, wherein at least one pixel renders image information that is a mix of bits of partial information from at least two different views.

23. An arrangement as claimed in claim 1, wherein the imaging device comprises an LC display, a plasma display, or an OLED screen.

24. An arrangement as claimed in claim 1, further comprising a translucent image display device and exactly one array of filter elements, which is arranged between the image display device and a planar illuminating device, and a switchable diffusing plate between the image display device and the filter array, so that in a first mode of operation, in which the switchable diffusing plate is switched to be transparent, a spatial impression is produced for the observer, and in a second mode of operation, in which the switchable diffusing plate is switched to be at least partially diffusing, the effect of the array of filter elements is cancelled to the greatest possible extent, so that the diffused light permits a homogeneous illumination of the image display device in the greatest possible degree, and that two-dimensional image contents can be displayed on the said image display device with undiminished resolution.

25. An arrangement as claimed in claim 1 wherein at least one array of filter elements which contains pixels of an electrochromic or photochromic design that at least partially act as wavelength or gray level filters, the array exhibiting, in a first mode of operation, a filter array structure that is suitable for 3D display, and in a second mode of operation the pixels of electrochromic or photochromic design are switched to be as transparent as possible, to the entire visible spectrum.

26. An arrangement as claimed in claim 25, comprising the wavelength or gray level filters of electrochromic or photochromic design and wavelength or gray level filters of invariable transmission properties, the wavelength or gray level filters of invariable transmission properties being substantially transparent to the entire visible spectrum.

27. A method for spatial display of a scene or object, comprising
  - rendering bits of partial information, from at least three views of the scene or object, with an imaging device, wherein the imaging device has a great number of pixels in a raster of rows and columns;
  - giving propagation directions, to the light emitted by the pixels of the imaging device, by using an array of filter elements arranged in rows and columns, part of which are transparent to light of specified wavelength ranges, and the remaining part are opaque to light, the array being arranged in front of or behind the imaging device with the pixels, wherein each pixel corresponds with several filter elements assigned to it, or each filter element corresponds with several pixels assigned to it, in such a way that each straight line connecting the area center of a visible segment of the pixel and the area center of a visible segment of the filter element corresponds to a propagation direction, and in which, within a viewing space in which observers located, the propagation directions intersect at a great number of intersection points, each of which represents an observer's position, so that the observer at any of these positions will predominantly see bits of partial information from a first selection of views with a first eye, and predominantly bits of partial information from a second selection of views with a second eye; and
  - wherein, in at least a segment of the array, the ratio between the areas covered by filter elements transparent to light of specified wavelength ranges and the total area of all filter elements, multiplied by the average number of the different views displayed per row of the raster of pixels, is greater than one.

\* \* \* \* \*